United States Patent
Phan et al.

(10) Patent No.: US 9,718,545 B2
(45) Date of Patent: Aug. 1, 2017

(54) MICRO HYBRID GENERATOR SYSTEM DRONE

(71) Applicant: Top Flight Technologies, Inc., Malden, MA (US)

(72) Inventors: Long N. Phan, Somerville, MA (US); Sanjay Emani Sarma, Lexington, MA (US); Cody Miles Wojcik, Fremont, NH (US); Eli M. Davis, Cambridge, MA (US); Benjamin Arthur Sena, Winthrop, MA (US); Julian Lemus, Somerville, MA (US)

(73) Assignee: Top Flight Technologies, Inc., Malden, MA (US)

( * ) Notice: Subject to any disclaimer, the term of this patent is extended or adjusted under 35 U.S.C. 154(b) by 0 days.

(21) Appl. No.: 15/262,177

(22) Filed: Sep. 12, 2016

(65) Prior Publication Data
US 2016/0376005 A1    Dec. 29, 2016

Related U.S. Application Data

(63) Continuation of application No. 14/942,600, filed on Nov. 16, 2015.
(Continued)

(51) Int. Cl.
*B64C 27/08* (2006.01)
*B64C 39/02* (2006.01)
(Continued)

(52) U.S. Cl.
CPC .......... *B64C 39/024* (2013.01); *B64C 27/001* (2013.01); *B64C 27/08* (2013.01);
(Continued)

(58) Field of Classification Search
None
See application file for complete search history.

(56) References Cited

U.S. PATENT DOCUMENTS 3,886,810 A    6/1975 Sugiyama et al.
6,018,200 A    1/2000 Anderson
(Continued)

FOREIGN PATENT DOCUMENTS

| GB | 2329427 | 11/2000 |
|---|---|---|
| WO | WO 2010/140082 | 12/2010 |
| WO | WO 2015/138217 | 9/2015 |

OTHER PUBLICATIONS

International Search Report and Written Opinion of the International Searching Authority for App. Ser. No. PCT/US16/62060, mailed Feb. 7, 2017, 9 pages.
(Continued)

*Primary Examiner* — Richard G Davis
(74) *Attorney, Agent, or Firm* — Fish & Richardson P.C.

(57) ABSTRACT

An unmanned aerial vehicle comprising at least one rotor motor. The rotor motor is powered by a micro hybrid generation system. The micro hybrid generator system comprises a rechargeable battery configured to provide power to the at least one rotor motor, a small engine configured to generate mechanical power, a generator motor coupled to the small engine and configured to generate AC power using the mechanical power generated by the small engine, a bridge rectifier configured to convert the AC power generated by the generator motor to DC power and provide the DC power to either or both the rechargeable battery and the at least one rotor motor, and an electronic control unit configured to control a throttle of the small engine based, at least in part, on a power demand of at least one load, the at least one load including the at least one rotor motor.

30 Claims, 17 Drawing Sheets

Related U.S. Application Data

(60) Provisional application No. 62/080,554, filed on Nov. 17, 2014, provisional application No. 62/080,482, filed on Nov. 17, 2014, provisional application No. 62/079,890, filed on Nov. 14, 2014, provisional application No. 62/079,866, filed on Nov. 14, 2014.

(51) Int. Cl.
| | | |
|---|---|---|
| *B64D 27/02* | (2006.01) | |
| *B64C 27/00* | (2006.01) | |
| *B64D 33/08* | (2006.01) | |
| *B64D 27/24* | (2006.01) | |
| *B64D 1/08* | (2006.01) | |
| *B64D 1/22* | (2006.01) | |
| *B64F 3/02* | (2006.01) | |
| *G05D 1/10* | (2006.01) | |

(52) U.S. Cl.
CPC ............... *B64D 1/08* (2013.01); *B64D 1/22* (2013.01); *B64D 27/02* (2013.01); *B64D 27/24* (2013.01); *B64D 33/08* (2013.01); *B64F 3/02* (2013.01); *G05D 1/101* (2013.01); *B64C 2201/027* (2013.01); *B64C 2201/042* (2013.01); *B64C 2201/044* (2013.01); *B64C 2201/063* (2013.01); *B64C 2201/066* (2013.01); *B64C 2201/108* (2013.01); *B64D 2027/026* (2013.01); *B64D 2221/00* (2013.01); *Y02T 50/44* (2013.01); *Y02T 50/64* (2013.01)

(56) References Cited

U.S. PATENT DOCUMENTS

| | | | |
|---|---|---|---|
| 6,142,421 A * | 11/2000 | Palmer | B64C 39/024 220/4.13 |
| 6,320,356 B1 | 11/2001 | Asai | |
| 7,763,336 B2 | 7/2010 | Clarke et al. | |
| 8,128,019 B2 | 3/2012 | Annati et al. | |
| 8,966,911 B2 | 3/2015 | Ress, Jr. et al. | |
| 9,045,218 B2* | 6/2015 | Childress | B60L 9/00 |
| 9,248,908 B1 | 2/2016 | Luyks | |
| 9,376,208 B1 | 6/2016 | Gentry | |
| 9,467,021 B2 | 10/2016 | Wright | |
| 2003/0057327 A1* | 3/2003 | Carroll | B64C 39/024 244/139 |
| 2003/0066932 A1* | 4/2003 | Carroll | B64C 39/024 244/120 |
| 2008/0184906 A1* | 8/2008 | Kejha | B64C 39/024 102/374 |
| 2009/0008499 A1 | 1/2009 | Shaw | |
| 2010/0147993 A1 | 6/2010 | Annati | |
| 2010/0327601 A1* | 12/2010 | Wilson, III | B64C 39/024 290/1 R |
| 2011/0147105 A1 | 6/2011 | Dimitrov | |
| 2011/0180667 A1* | 7/2011 | O'Brien | B64C 39/022 244/135 R |
| 2012/0056040 A1 | 3/2012 | Brotherton-Ratcliffe | |
| 2012/0234964 A1* | 9/2012 | Heppe | B64B 1/00 244/2 |
| 2013/0062455 A1 | 3/2013 | Lugg | |
| 2013/0099065 A1* | 4/2013 | Stuhlberger | B64C 29/0033 244/7 C |
| 2014/0179535 A1 | 6/2014 | Stuckl | |
| 2014/0203760 A1 | 7/2014 | Lammers | |
| 2015/0151844 A1* | 6/2015 | Anton | B64C 31/024 244/55 |
| 2015/0315766 A1 | 11/2015 | Take | |
| 2016/0039300 A1* | 2/2016 | Wang | B60L 11/1822 244/39 |
| 2016/0039540 A1* | 2/2016 | Wang | B64F 1/36 244/114 R |
| 2016/0185459 A1* | 6/2016 | Kiefer | B64C 39/024 244/54 |
| 2016/0196756 A1* | 7/2016 | Prakash | B64C 39/024 701/3 |
| 2016/0200436 A1 | 7/2016 | North | |
| 2016/0221683 A1* | 8/2016 | Roberts | B64D 27/02 |
| 2016/0236790 A1 | 8/2016 | Knapp | |
| 2016/0244158 A1 | 8/2016 | Fredericks | |
| 2016/0244160 A1 | 8/2016 | Colten | |
| 2016/0257416 A1* | 9/2016 | Himmelmann | B64D 27/02 |
| 2016/0261168 A1 | 9/2016 | Harrison | |
| 2017/0066531 A1 | 3/2017 | McAdoo | |

OTHER PUBLICATIONS

Internet Archive, Phil's Page, "Utterpower" [online] [retrieved on Mar. 28, 2017]. Retrieved from the Internet: https://web.archive.org/web/20100824210244/http://www.utterpower.com/phil's.htm.

JBJ Techniques Limited, "Spider Couplings" [online] [retrieved on Mar. 28, 2017]. Retrieved from the Internet: https://www.jbj.co.uk/spider-couplings.html.

* cited by examiner

MICRO HYBRID GENERATOR SYSTEM DRONE

This application is a continuation application and claims priority under 35 USC §120 to U.S. patent application Ser. No. 14/942,600, filed Nov. 16, 2015, which claims priority to U.S. Provisional Application No. 62/079,866, filed on Nov. 14, 2014, U.S. Provisional Application No. 62/079,890, filed on Nov. 14, 2014, U.S. Provisional Application No. 62/080,482, filed on Nov. 17, 2014, and U.S. Provisional Application No. 62/080,554, filed on Nov. 17, 2014, each of which is incorporated by reference in its entirety.

FIELD OF THE INVENTION

This invention relates to a micro hybrid generator system drone.

BACKGROUND OF THE INVENTION

A typical conventional multi-rotor UAV is significantly less complex, easier to operate, less expensive, and easier to maintain than a typical conventional single rotor aerial vehicle, such as a helicopter or similar type aerial vehicle. For example, a conventional multi-rotor UAV may include four or more rotor motors, four or more propellers coupled thereto, four or more electronic speed controllers, a flight control system (auto pilot), an RC radio control, a frame, and a rechargeable battery, such as a lithium polymer (LiPo) or similar type rechargeable battery. In contrast, a single rotor aerial vehicle, such as a helicopter, may have thousands of parts. Additionally, single rotor aerial vehicles are also notoriously difficult to operate, diagnose problems, and are expensive to maintain.

Multi-rotor UAVs can perform vertical take-off and landing (VTOL) and are capable of aerial controls with similar maneuverability to single rotor aerial vehicles. Multi-rotor UAVs are relatively easy to assemble and may use commercial off the shelf (COTS) hardware including auto pilot flight controllers that are easily adaptable to standard configurations, e.g., a quad-rotor, a hex-rotor, an octo-rotor, and the like.

A typical conventional multi-rotor UAV relies solely on rechargeable battery or batteries to provide power to drive the rotor motors coupled to the propellers to provide flight. A typical conventional multi-rotor UAV includes a lithium polymer (LiPo) battery which may provide about 150 to 210 Wh/kg. This may provide a typical loaded flight time of about 15 minutes and an unloaded flight time of about 32 to 45 minutes. Advance lithium sulfur batteries may also be used which provide about 400 Wh/kg of power. In this case, the flight times are about 30 minutes in a loaded configuration.

In operation, the battery is used for the entire flight of the conventional multi-rotor UAV. Thus, when the battery is depleted, the UAV will stop operating. If the UAV is in flight, this can result in a catastrophic crashing of the UAV. Additionally, if aggressive maneuvers are needed during flight, such as quickly veering away from an object or moving quickly to avoid a potential threat, such maneuvers require instantaneous peak power which can quickly deplete the battery and significantly reduce flight time significantly.

Thus, conventional battery powered multi-rotor UAVs have limited endurance and payload and provide no backup power in the event the battery supply is depleted. Additionally, conventional commercial UAVs are very expensive and not commercially viable at scale today.

Conventional portable generators are heavy and may be difficult to transport to desired locations. Additionally, micro grid power systems used for electric grid power backup or ultra-micro power systems used in cell towers for power backup rely solely on batteries to provide the needed backup power.

Thus, there is a need for a small, lightweight, portable generator system which can provide power in such applications. Additionally, there is a need for UAVs with improved operational characteristics. For example, there is a need for UAVs capable of operating for longer durations.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In various embodiments, an unmanned aerial vehicle comprising at least one rotor motor configured to drive at least one propeller to rotate, rotation of the at least one propeller generating thrust and causing the unmanned aerial vehicle to fly. In various embodiments, the unmanned aerial vehicle comprises an electronic speed control configured to control an amount of power provided to the at least one rotor motor. Further, in various embodiments, an unmanned aerial vehicle comprises a micro hybrid generator system configured to provide power to the at least one rotor motor comprising. In various embodiments, an unmanned aerial vehicle comprises a rechargeable battery configured to provide power to the at least one rotor motor. Further, in various embodiments, an unmanned aerial vehicle comprises a small engine configured to generate mechanical power. Additionally, in various embodiments, an unmanned aerial vehicle comprises a generator motor coupled to the small engine and configured to generate AC power using the mechanical power generated by the small engine. Further, in various embodiments, an unmanned aerial vehicle comprises a bridge rectifier configured to convert the AC power generated by the generator motor to DC power and provide the DC power to either or both the rechargeable battery and the at least one rotor motor. In various embodiments, an unmanned aerial vehicle comprises an electronic control unit configured to control a throttle of the small engine based, at least in part, on a power demand of at least one load, the at least one load including the at least one rotor motor.

These and other advantages will become apparent to those skilled in the relevant art upon a reading of the following descriptions and a study of the several examples of the drawings.

DETAILED DESCRIPTION OF THE INVENTION

Figure 1:
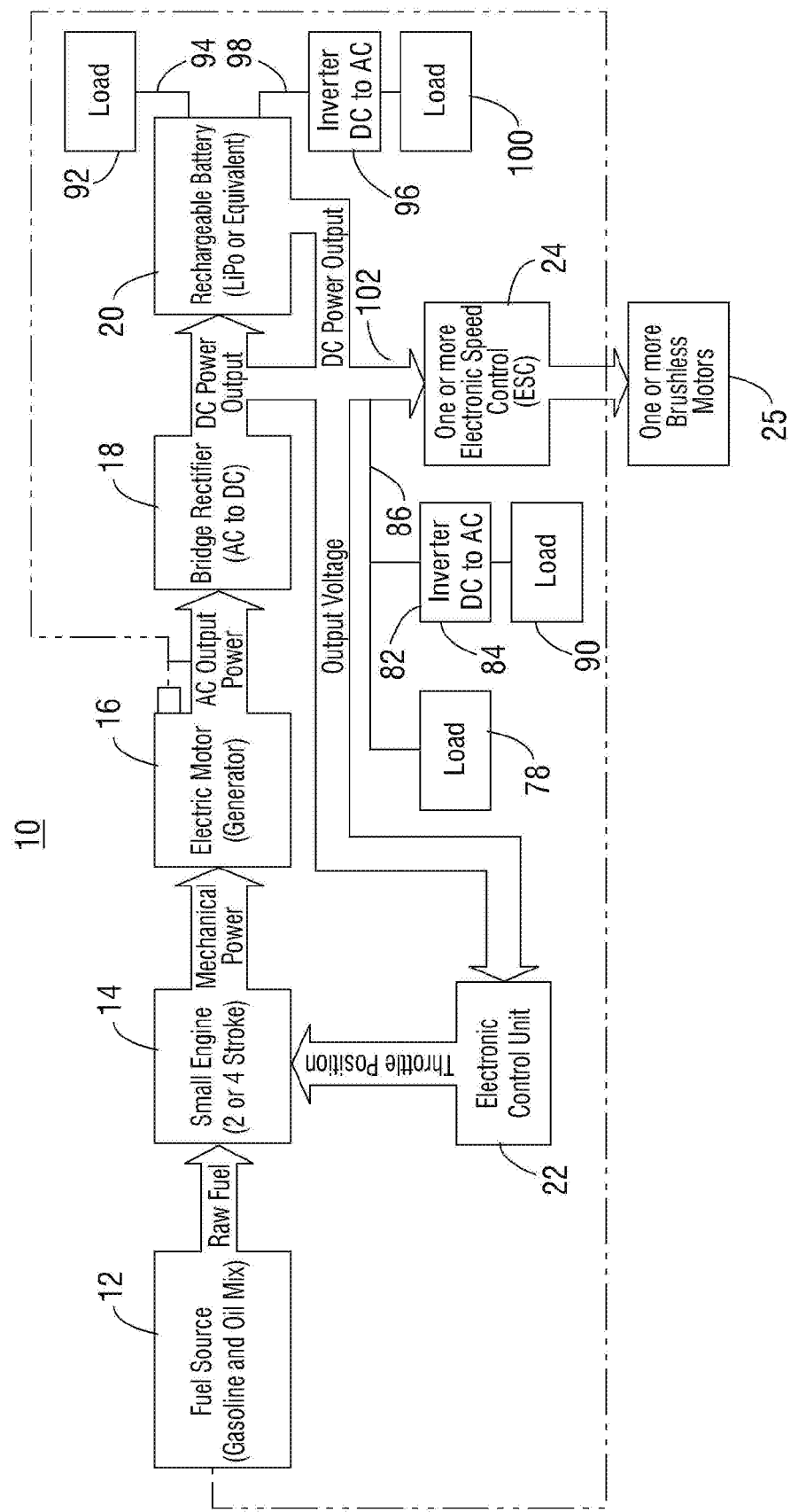
FIG. 1 depicts a diagram of an example micro hybrid generator system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, any claims based on this provisional patent application are not to be limited to that embodiment. Moreover, any such claims are not to be read restrictively unless there is clear and convincing evidence manifesting a certain exclusion, restriction, or disclaimer.

One or more embodiments of a micro hybrid generator system provide a small portable micro hybrid generator power source with energy conversion efficiency. In UAV applications, the micro hybrid generator system of one or more embodiments can be used to overcome the weight of the vehicle, the micro hybrid generator drive, and fuel necessary to provide extended endurance and payload capabilities in UAV applications. In other applications, the micro hybrid generator device system can be used as a small, lightweight, portable generator for residential and commercial applications or as a micro-grid generator or an ultra-micro-grid generator, and the like.

The micro hybrid generator system of one or more embodiment of can comprise two separate power systems. A first power system included as part of the micro hybrid generator system can be a small and efficient gasoline powered engine coupled to a generator motor. In various embodiments, the first power system serves as a primary source of power of the micro hybrid generator system. A second power system, included as part of the micro hybrid generator system, can be a high energy density rechargeable battery. Together, the first power system and the second power system, combine to form a high energy continuous power source and high peak power availability for a UAV, including when a UAV performs aggressive maneuvers. Further, one of the first power system and the second power system can serve as back-up power sources of the micro hybrid generator system if a corresponding one of the first power system or the second power system fails. In various embodiments, the micro hybrid generator system can serve as a portable, lightweight generator to provide power in residential and commercial applications or as a micro-grid or ultra-micro-grid generator.

FIG. 1 depicts a diagram of an example micro hybrid generator system 10. The micro hybrid generator system 10 includes a fuel source 12, e.g., a vessel for storing gasoline, a mixture of gasoline and oil mixture, or similar type fuel or mixture. The fuel source 12 provides fuel to a small engine 14, of a first power system. The small engine 14 can use the fuel provided by the fuel source 12 to generate mechanical energy. In one example, the small engine 14 can have dimensions of about 12" by 11" by 6" and a weight of about 3.5 lbs. to allow for integration in a UAV. In one example, the small engine 14 may be an HWC/Zenoah G29 RCE 3D Extreme available from Zenoah, 1-9 Minamidai Kawagoe, Saitama 350-1165, Japan. The micro hybrid generator system 10 also includes a generator motor 16 coupled to the small engine 14. The generator motor 16 functions to generate AC output power using mechanical power generated by the small engine 14. In various embodiments, a shaft of the small engine 14 includes a fan that dissipates heat away from the small engine 14. In various embodiments, the generator motor 16 is coupled to the small engine 14 through a polyurethane coupling.

In one embodiment, the micro hybrid generator system 10 can provide 1.8 kW of power. Further in the embodiment, the micro hybrid generator system 10 can include a small engine 14 that provides approximately 3 horsepower and weighs approximately 1.5 kg, e.g. a Zenoah® G29RC Extreme engine. In the embodiment, the micro hybrid generator system 10 includes a generator motor 16 that is a brushless motor, 380 Kv, 8 mm shaft, part number 5035-380, available from Scorpion Precision Industry®. In another embodiment, the micro hybrid generator system 10 can provide 10 kW of power. Further in the another embodiment, the micro hybrid generator system 10 can include a small engine 14 that provides approximately between 15-16.5 horsepower and weighs approximately 7 pounds, e.g. a Desert Aircraft® DA-150. In the another embodiment, the micro hybrid generator system 10 includes a generator motor 16 that is a Joby Motors® JM1 motor.

The micro hybrid generator system 10 includes a bridge rectifier 18 and a rechargeable battery 20. The bridge rectifier 18 is coupled between the generator motor 16 and the rechargeable battery 20 and converts the AC output of the generator motor 16 to DC power to charge the rechargeable battery 20 or provide DC power to load 78 by line 82 or power to DC-to-AC inverter 84 by line 86 to provide AC power to load 90. The rechargeable battery 20 may provide DC power to load 92 by line 94 or to DC-to-AC inverter 96 by line 98 to provide AC power to load 100. In one example, an output of the bridge rectifier 18 and/or the rechargeable battery 20 of micro hybrid generator system 10 is provided by line 102 to one or more electronic speed control devices (ESC) 24 integrated in one or more rotor motors 25 as part of an UAV. The ESC 24 can control the DC power provided by bridge rectifier 18 and/or rechargeable battery 20 to one or more rotor motors provided by generator motor 16. In one example, the ESC 24 can be a T-Motor® ESC 45A (2-6S) with SimonK. In one example, the bridge rectifier 18 can be a model #MSD I00-08, diode bridge 800V IOOA SM3, available from Microsemi Power Products Group®.

In various embodiments, the ESC 24 can control an amount of power provided to one or more rotor motors 25 in response to input received from an operator. For example, if an operator provides input to move a UAV to the right, then the ESC 24 can provide less power to rotor motors 25 on the right of the UAV to cause the rotor motors to spin propellers on the right side of the UAV slower than propellers on the left side of the UAV. As power is provided at varying levels to one or more rotor motors 25, a load, e.g. an amount of power provided to the one or more rotor motors 25, can change in response to input received from an operator.

In one embodiment, the rechargeable battery 20 may be a LiPo battery, providing 3000 mAh, 22.2V 65C, Model PLU65-30006, available from Pulse Ultra Lipo®, China. In other designs, the rechargeable battery 20 may be a lithium sulfur (LiSu) rechargeable battery or similar type of rechargeable battery.

The micro hybrid generator system 10 includes an electronic control unit (ECU) 22. The ECU 22, and other applicable systems described in this paper, can be implemented as a computer system, a plurality of computer systems, or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, Ethernet interface, satellite transmission interface (e.g. "direct PC"), or other interfaces for coupling a computer system to other computer systems. Interfaces enable computer systems and other devices to be coupled together in a network.

A computer system can be implemented as a module, as part of a module, or through multiple modules. As used in this paper, a module includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the module's functionality, or the like. As such, a first module and a second module can have one or more dedicated processors, or a first module and a second module can share one or more processors with one another or other modules. Depending upon implementation-specific or other considerations, a module can be centralized or its functionality distributed. A module can include hardware, firmware, or software embodied in a computer-readable medium for execution by the processor. The processor transforms data into new data using implemented data structures and methods, such as is described with reference to the FIGS. in this paper.

The ECU 22 is coupled to the bridge rectifier 18 and the rechargeable battery 20. The ECU 22 can be configured to measure the AC voltage of the output of the generator motor 16, which is directly proportional to the revolutions per minute (RPM) of the small engine 14, and compares it to the DC power output of the bridge rectifier 18. The ECU 22 can control the throttle of the small engine 14 to cause the DC power output of the bridge rectifier 18 to increase or decrease as the load changes, e.g., a load of one or more electric motors 25 or one or more of loads 78, 90, 92, and 100. In one example, the ECU 22 can be an Arduino® MEGA 2560 Board R3. In various embodiments, a load of one or more electric motors 25 can change as the ESC 24 changes an amount of power provided to the electric motors 25. For example, if a user inputs to increase the power provided to the electric motors 25 subsequently causing the ESC 24 to provide more power to the electric motors 25, then the ECU 22 can increase the throttle of the small engine 14 to cause the production of more power to provide to the electronic motors 25.

The ECU 22 can function to maintain voltage output of loads by reading the sensed analog voltage, converting these to ADC counts, comparing the count to that corresponding to a desired voltage, and increasing or decreasing the throttle of the small engine 14 according to the programmed gain if the result is outside of the dead band.

In one example, the micro hybrid generator system 10 can provide about 1,800 watts of continuous power, 10,000 watts of instantaneous power (e.g., 6S with 16,000 mAh pulse battery) and has a 1,500 Wh/kg gasoline conversion rate. In one example, the micro hybrid generator system 10 has dimensions of about 12" by 12" by 12" and a weight of about 8 lbs.

Figure 2:
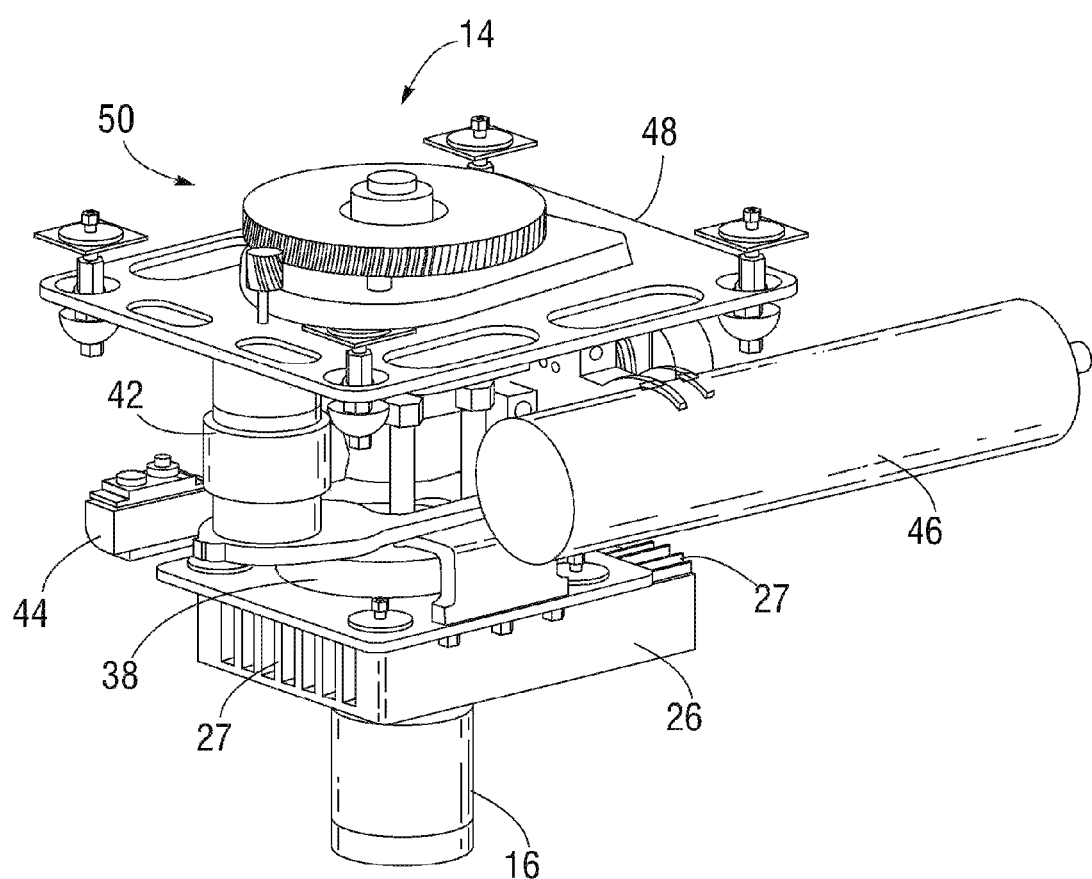
FIG. 2 depicts a side perspective view of a micro hybrid generator system.
Figure 3B:
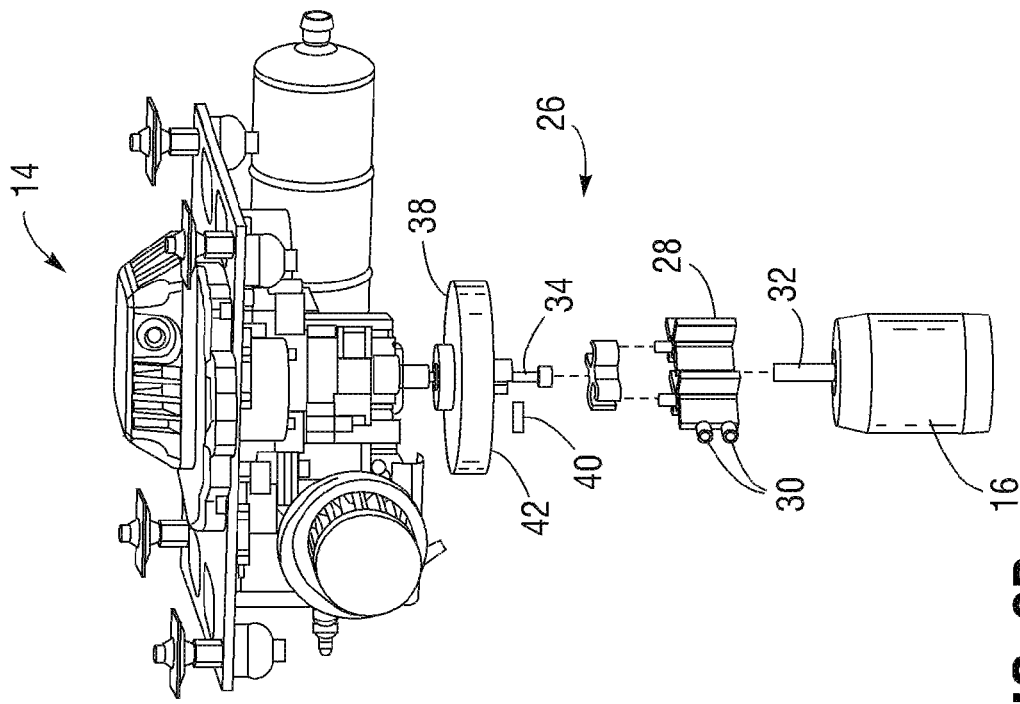
FIG. 3B depicts an exploded side view of a micro hybrid generator.
Figure 3A:
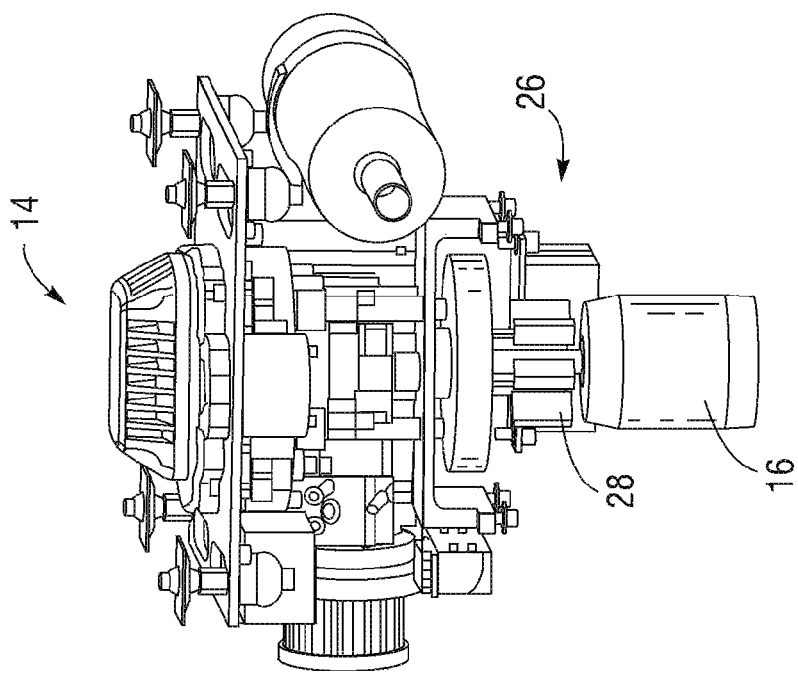
FIG. 3A depicts a side view of a micro hybrid generator.

FIG. 2 depicts a side perspective view of a micro hybrid generator system 10. FIG. 3A depicts a side view of a micro hybrid generator 10. FIG. 3B depicts an exploded side view of a micro hybrid generator 10. The micro hybrid generator system 10 includes a small engine 14 coupled to generator motor 16. In one embodiment, the small engine 14 includes a coupling/cooling device 26 which provides coupling of the shaft of the generator motor 16 to the shaft of small engine 14 and also provides cooling with sink fins 27. For example, FIGS. 3A and 3B, show in further detail one embodiment of coupling/cooling device 26, which includes coupling/fan 28 with set screws 30 that couple shaft 32 of generator motor 16 and shaft 34 of small engine 14. Coupling/cooling device 26 may also include rubber coupling ring 36.

In various embodiments, the micro hybrid generator system 10 includes components to facilitate transfer of heat away from the micro hybrid generator system 10 and/or is integrated within a UAV to increase airflow over components that produce heat. For example, the hybrid generator system 10 can include cooling fins on specific components, e.g. the rectifier, to transfer heat away from the micro hybrid generator system. In various implementations, the micro hybrid generator system 10 includes components and is integrated within a UAV to cause heat to be transferred towards the exterior of the UAV.

In various embodiments, the micro hybrid generator system 10 and/or a UAV integrating the micro hybrid generator system 10 is configured to allow 406 cubic feet per minute of airflow across at least one component of the micro hybrid generator system 10. A small engine 14 of the micro hybrid generator system 10 can be run at an operating temperature 150° C. and if an ambient temperature in which the micro hybrid generator system 10, in order to remove heat generated by the small engine 14, an airflow of 406 cubic feet per minute is achieved across at least the small engine 16. Further in various embodiments, the small engine 14 is operated at 16.5 Horsepower and generates 49.2 kW of waste heat, e.g. each head of the small engine produces 24.6 kW of waste heat. In various embodiments, electric ducted fans are used to concentrate airflow over the engine heads. For example, 406 cubic feet per minute airflow can be achieved over engine heads of the small engine 14 using electric ducted fans.

In various embodiments, the micro hybrid generator system 10 is integrated as part of a UAV using a dual vibration damping system. A small engine 14 of the micro hybrid generator system can utilize couplings to accommodate for misalignment between the engine and generator. A dual vibration damping system using both compression and torsional dampers can provide damping between the micro hybrid generator system 10 and a structure to which it is mounted, e.g. a drone. In one example, the small engine 14 produces a mean torque of 1.68 Nm at 10,000 RPM.

In various embodiments, a urethane coupling is used to couple the small engine 14 to the generator motor 16. Further in the one example, the urethane coupling can have a durometer value of between 90 A to 75 D. Example urethane couplings used to secure, at least part of, the micro hybrid generator system 10 to a UAV include L42 Urethane, L100 Urethane, L167 Urethane, and L315 Urethane. Urethane couplings used to secure, at least part of, the micro hybrid generator system 10 to a UAV can have a tensile strength between 20 MPa and 62.0 MPa, between 270 to 800% elongation at breaking, a modulus between 2.8 MPa and 32 MPa, an abrasion index between 110% and 435%, and a tear strength split between 12.2 kN/m and 192.2 kN/m.

Small engine 14, FIGS. 2 and 3, also includes fly wheel 38 which reduces mechanical noise and/or engine vibration. Preferably, small engine 14 includes Hall Effect sensor 40, FIG. 3, and Hall Effect magnet coupled to fly wheel 38 as shown. In one example, Hall-effect sensor 40 may be available from RCexl Min Tachometer®, Zhejiang Province, China.

When small engine 14 is operational, fly wheel 38 spins at a speed based on throttle. The spinning speed of fly wheel 38 is measured by Hall effect sensor 40. The voltage generated by Hall effect sensor 40 is input into an ECU 22. In various embodiments, the ECU 22 compares the output by the generator motor 16 to ensure that a proper voltage is maintained and the battery does not discharge beyond a certain threshold. ECU 22 can then control the throttle of either or both the generator motor 16 and the small engine 14 to increase or decrease the voltage as needed to supply power to one or more of loads 78, 90, 92, and/or 100 or one or more rotor motors 25.

Small engine 14 may also include a starter motor 42, servo 44, muffler 46, and vibrational mount 48.

Figure 4:
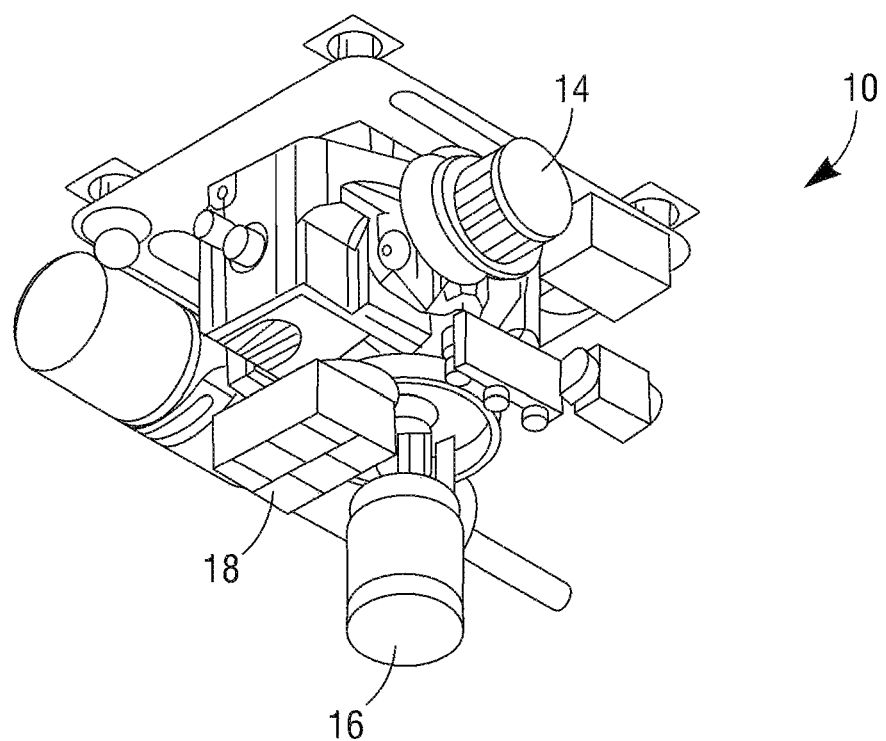
FIG. 4 depicts a perspective view of a micro hybrid generator system.

FIG. 4 is a perspective view of a micro hybrid generator system 10. The micro hybrid generator system 10 includes a small motor 14 and generator motor 16 coupled to a bridge rectifier 18.

Figure 5:
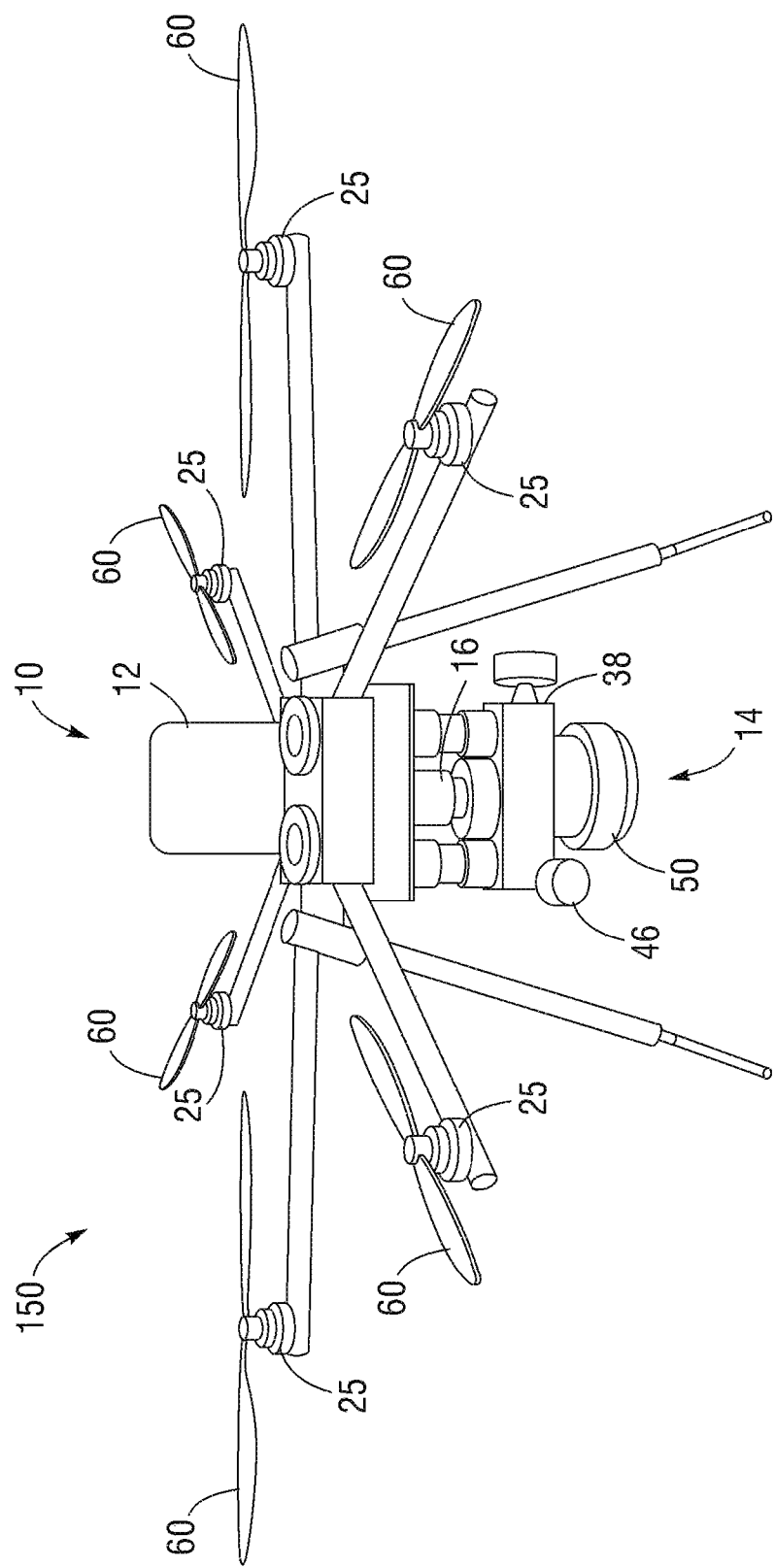
FIG. 5 is a perspective view of a UAV integrated with a micro hybrid generator system.

FIG. 5 is a perspective view of a UAV 150 integrated with a micro hybrid generator system 10. The UAV 150 includes six rotor motors 25 each coupled to propellers 60, however it is appreciated that a UAV integrated with a micro hybrid generator system 10 can include more or less rotor motors and propeller. The UAV 150 can include a Px4 flight Controller® implemented as part of a 3 DR Pixhawk®.

In one embodiment, small engine 14, as shown in FIGS. 1-5 may be started using an electric starter 50. Fuel source 12, as shown in FIG. 1 (also shown in FIG. 5) delivers fuel to small engine 14 to spin its rotor shaft directly coupled to generator motor 16 as shown in FIG. 3 and applies a force to generator motor 16. The spinning of generator motor 16 generates electricity and the power generated by motor generator 16 is proportional to the power applied by shaft of small engine 14. Preferably, a target rotational speed of generator motor 16 is determined based on the KV (rpm/V) of generator motor 16. For example, if a target voltage of 25 Volt DC is desired, the rating of generator motor 16 would be about 400 KV. The rotational speed of the small engine 14 may be determined by the following equations:

$$RPM = KV(RPMVolt) \times Target\ Voltage\ (VDC) \tag{1}$$

$$RPM = 400\ KV \times 25\ VDC \tag{2}$$

$$RPM = 10,000 \tag{3}$$

In this example, for generator motor 16 to generate 25 VDC output, the shaft of generator motor 16 coupled to the shaft of small engine 14 needs to spin at about 10,000 RPM.

As the load, e.g., one or more motors 25 or one or more of loads 78, 90, 92, and/or 100, is applied to the output of generator motor 16, the voltage output of the battery drops, which is sensed by the ECU 22, which subsequently can increase a throttle of the small engine 14. In this case, ECU 22 can be used to help regulate the throttle of small engine 14 to maintain a consistent output voltage that varies with loads, preventing the system from losing power under load. ECU 22 can act like a standard governor for gasoline engines but instead of regulating an RPM, it can regulate a target voltage output of either or both a bridge rectifier and a generator motor 16 based on a closed loop feedback controller.

Power output from generator motor 16 can be in the form of alternating current (AC) which needs to be rectified by bridge rectifier 18. Bridge rectifier 18 can convert the AC power into direct current (DC) power, as discussed above. In various embodiments, the output power of the micro hybrid generator system 10 can be placed in a "serial hybrid" configuration, where the generator power output by generator motor 16 may be available to charge the rechargeable battery 20 or provide power to another external load.

In operation, there can be at least two available power sources when the micro hybrid generator system 10 is functioning. A primary source can be from the generator motor 16 through directly from the bridge rectifier and a secondary power source can be from the rechargeable battery 20. Therefore, a combination of continuous power availability and high peak power availability is provided, which may be especially well-suited for UAV applications or a portable generator applications. In cases where either primary (generator motor 16) power source is not available, system 10 can still continue to operate for a short period of time using power from rechargeable battery 20 allowing a UAV to sustain safety strategy, such as an emergency landing.

When micro hybrid generator system 10 is used for UAVs, the following conditions can be met to operate the UAV effectively and efficiently: 1) the total continuous power (watts) can be greater than power required to sustain UAV flight, 2) the power required to sustain a UAV flight is a function of the total weight of the vehicle, the total weight of the hybrid engine, the total weight of fuel, and the total weight of the payload), where:

$$Total\ Weight\ (gram) = vehicle\ dry\ weight + small\ engine\ 14\ weight + fuel\ weight + payload \tag{4}$$

and, 3) based on the vehicle configuration and aerodynamics, a particular lift motor will have an efficiency rating (grams/watt) of 11, where:

$$Total\ Power\ Required\ to\ Fly = YJ \times Weight\ (gram) \tag{5}$$

In cases where the power required to sustain flight is greater than the available continuous power, the available power or total energy is preferably based on the size and configuration of the rechargeable battery 20. A configuration of the rechargeable battery 20 can be based on a cell configuration of the rechargeable battery 20, a cell rating of the rechargeable battery 20, and/or total mAh of the rechargeable battery 20. In one example, for a 6S, 16000 mAh, 25 C battery pack, the total energy is determined by the following equations:

$$Total\ Energy = Voltage \times mAh = 25\ VDC(6S) \times 16000\ mAh = 400\ Watt*Hours \tag{6}$$

$$Peak\ Power\ Availability = Voltage \times mAh \times C\ Rating = 25\ VDC \times 16000\ mAh \times 25\ C = 10,400\ Watts \tag{7}$$

$$Total\ Peak\ Time = 400\ Watt*Hours/10,400\ Watts = 138.4\ secs \tag{8}$$

Further in the one example, the rechargeable battery 20 will be able to provide 10,400 Watts of power for 138.4 seconds in the event of primary power failure from small engine 14. Additionally, the rechargeable battery 20 may be able to provide up to 10,400 Watts of available power for flight or payload needs instantaneous peak power for short periods of time needed for aggressive maneuvers.

The result is micro hybrid generator system 10 when coupled to a UAV efficiently and effectively provides power to fly and maneuver the UAV for extended periods of time with higher payloads than conventional multi-rotor UAVs. In one example, the micro hybrid generator system 10 can provide a loaded (3 lb. load) flight time of up to about 2 hours 5 mins, and an unloaded flight time of about 2 hours and 35 mins Moreover, in the event that the fuel source runs out or the small engine 14 and/or the generator motor 16 malfunctions, the micro hybrid generator system 10 can use the rechargeable battery 20 to provide enough power to allow the UAV to perform a safe landing. In various embodiments, the rechargeable battery 20 can provide instantaneous peak power to a UAV for aggressive maneuvers, for avoiding objects, or threats, and the like.

In various embodiments, the micro hybrid generator system 10 can provide a reliable, efficient, lightweight, portable generator system which can be used in both commercial and residential applications to provide power at remote locations away from a power grid and for a micro-grid generator, or an ultra-micro-grid generator.

In various embodiments, the micro hybrid generator system 10 can be used for an applicable application, e.g. robotics, portable generators, micro-grids and ultra-micro-grids, and the like, where an efficient high energy density power source is required and where a fuel source is readily available to convert hydrocarbon fuels into usable electric power. The micro hybrid generator system 10 has been shown to be significantly more energy efficient than various forms of rechargeable batteries (Lithium Ion, Lithium Polymer, Lithium Sulfur) and even Fuel Cell technologies typically used in conventional UAVs.

Figure 6:
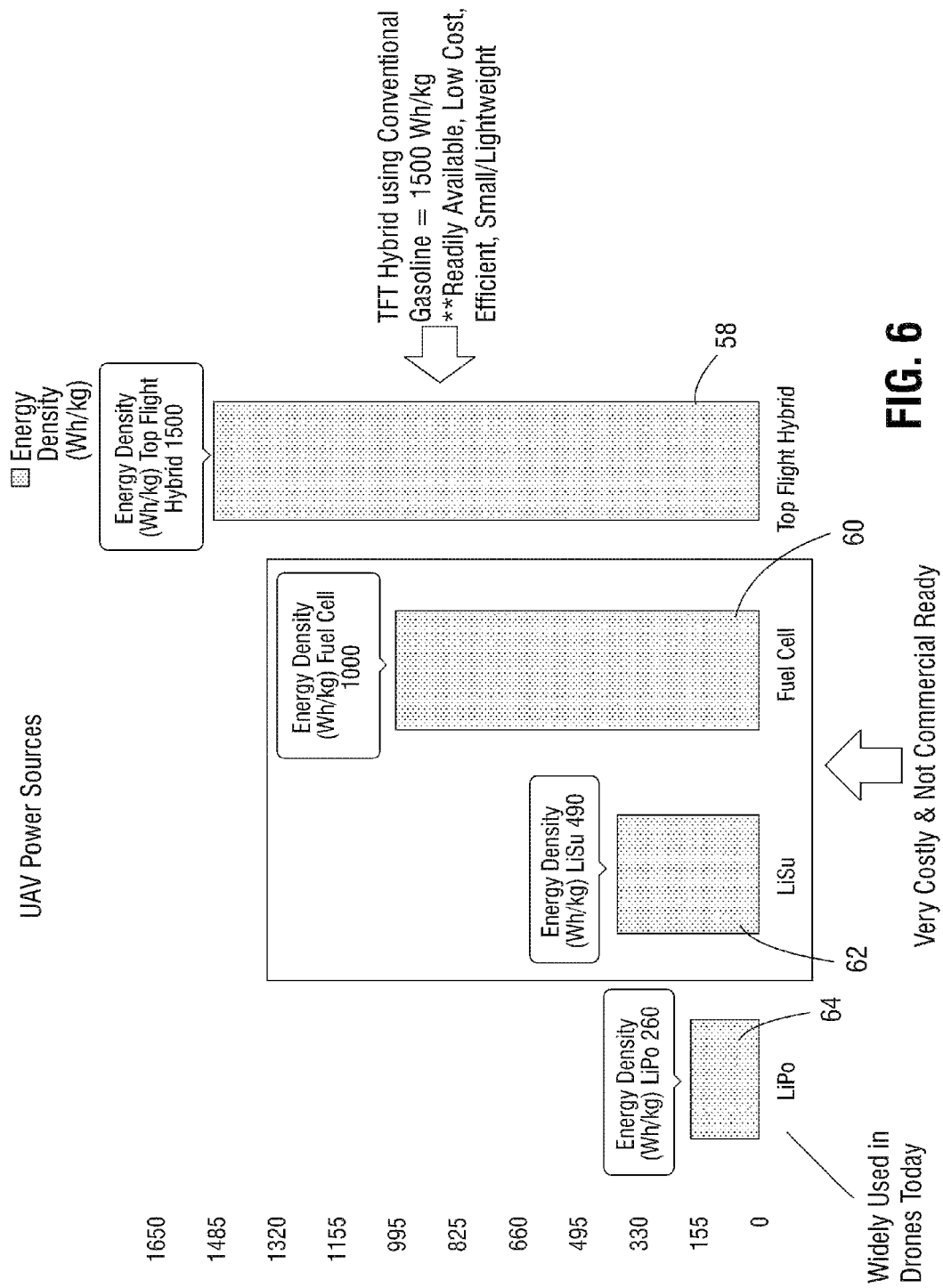
FIG. 6 depicts a graph comparing energy density of different UAV power sources.

FIG. 6 depicts a graph comparing energy density of different UAV power sources. In various embodiments, the micro hybrid generator system 10 can use conventional gasoline which is readily available at low cost and provide about 1,500 Wh/kg of power for UAV applications, e.g., as indicated at 58 in FIG. 6. Conventional UAVs which rely entirely on batteries can provide a maximum energy density of about 1,000 Wh/kg when using an energy high density fuel cell technology, indicated at 60 about 400 Wh/kg when using lithium sulfur batteries, indicated at 62, and only about 200 Wh/kg when using a LiPo battery, indicated at 64.

Figure 7:
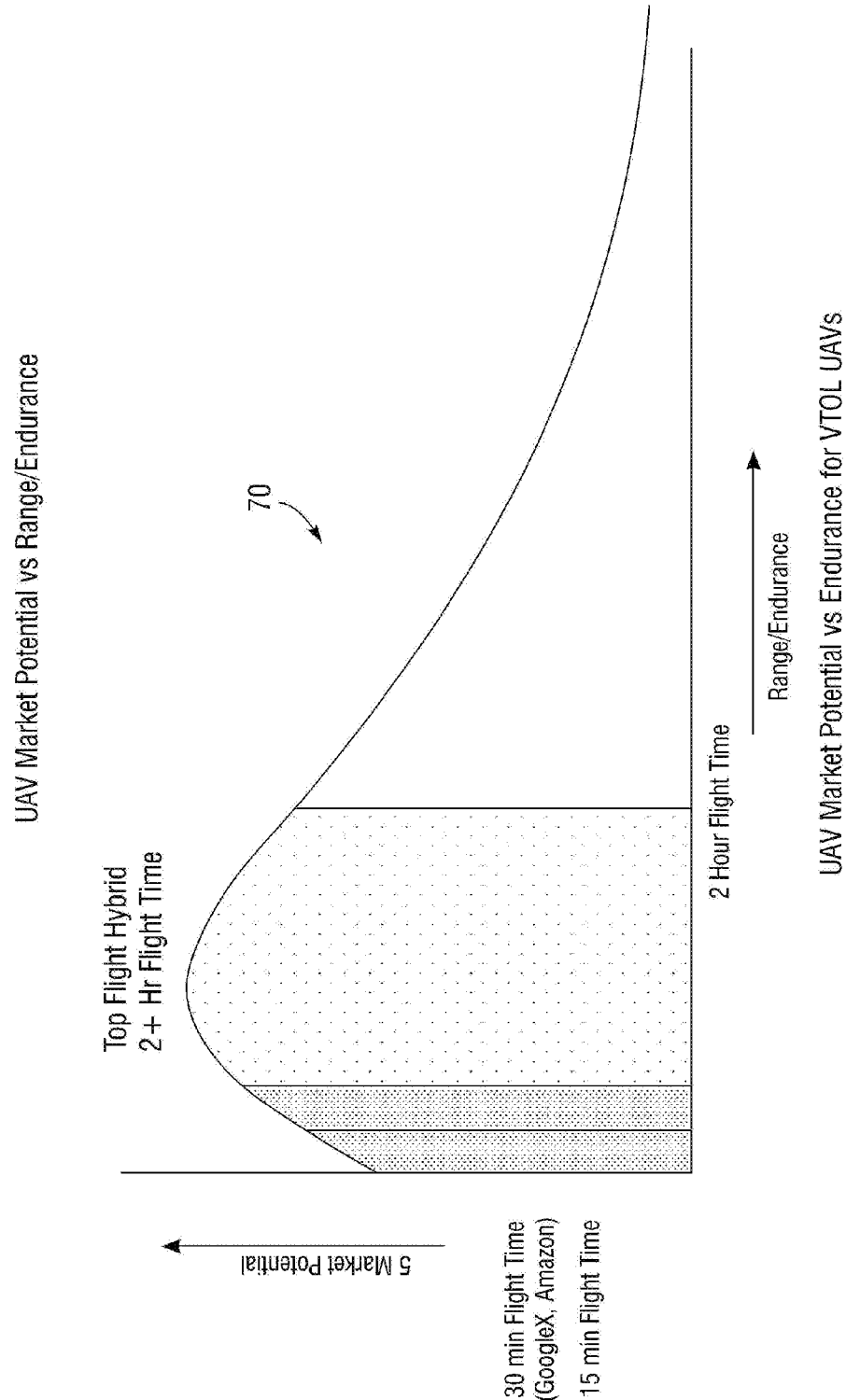
FIG. 7 depicts a graph of market potential for UAVs against flight time for an example two plus hours of flight time micro hybrid generator system of one or more embodiments when coupled to a UAV is able to achieve an example of the total market potential vs. endurance for the micro hybrid generator system for UAVs of this invention.

FIG. 7 depicts a graph of market potential for UAVs against flight time for an example two plus hours of flight time micro hybrid generator system 10 of one or more when coupled to a UAV is able to achieve and an example of the total market potential vs. endurance for the micro hybrid generator system 10 for UAVs of this invention.

In various embodiments, the micro hybrid generator power systems 10 can be integrated as part of a UAV or similar type aerial robotic vehicle to perform as a portable flying generator using the primary source of power to sustain flight of the UAV and then act as a primary power source of power when the UAV has reached its destination and is not in flight. For example, when a UAV which incorporates micro hybrid system 10, e.g., UAV 150, FIG. 5, is not in flight, the available power generated by micro hybrid system can be transferred to one or more of external loads 78, 90, 92, and/or 100 such that micro hybrid generator system 10 operates as a portable generator. Micro hybrid system generator 10 can provide continuous peak power generation capability to provide power at remote and often difficult to reach locations. In the "non-flight portable generator mode", micro hybrid system 10 can divert the available power generation capability towards external one or more of loads 78, 90, 92, and/or 100. Depending on the power requirements, one or more of DC-to-AC inverters 84, 96 may be used to convert DC voltage to standard AC power (120 VAC or 240 VAC).

In operation, micro hybrid generator system 10 coupled to a UAV, such as UAV 150, FIG. 5, will be able to traverse from location to location using aerial flight, land, and switch on the power generator to convert fuel into power.

Figure 8:
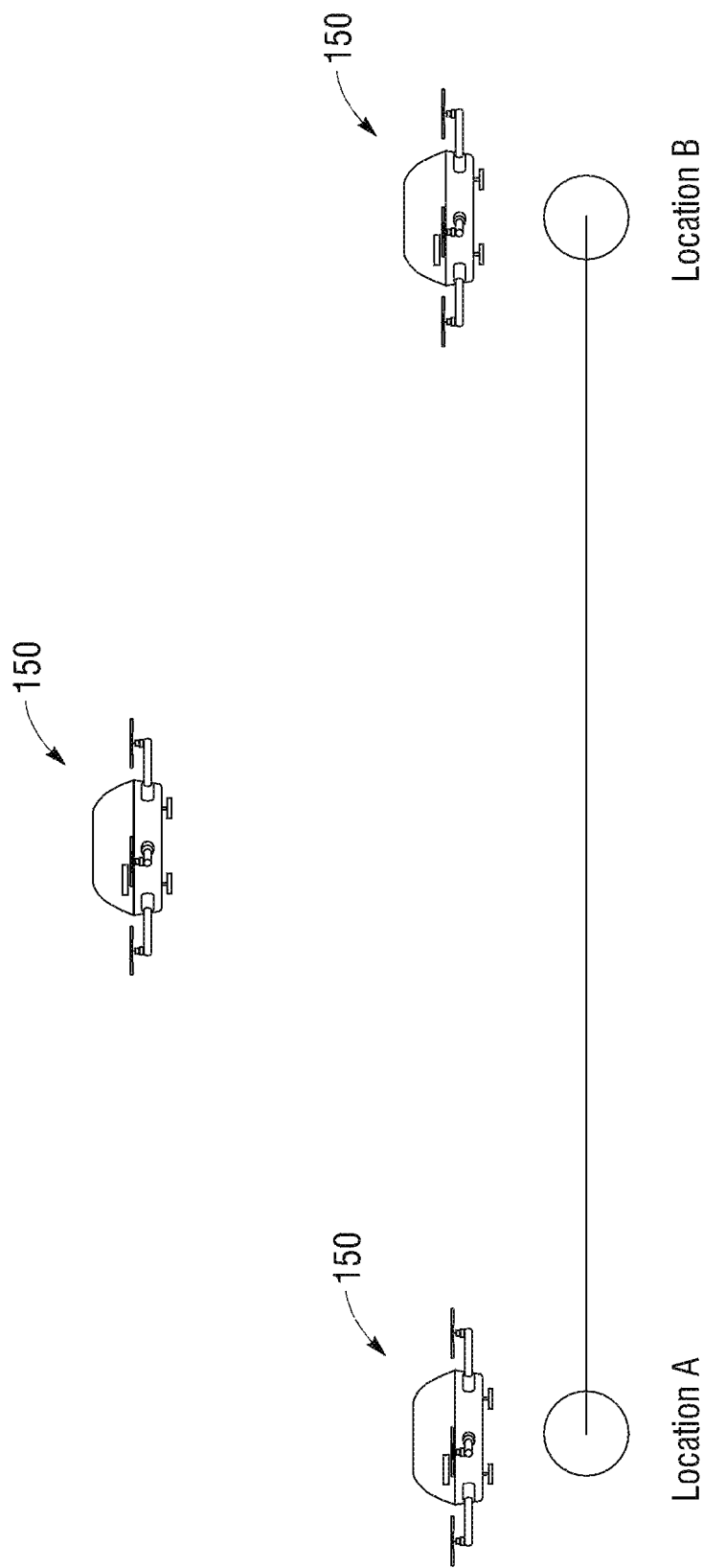
FIG. 8 shows an example flight pattern of a UAV with a micro hybrid generator system.

FIG. 8 shows an example flight pattern of a UAV with a micro hybrid generator system 10. In the example flight pattern shown in FIG. 8, the UAV 150, with micro hybrid system 10 coupled thereto, begins at location A loaded with fuel ready to fly. The UAV 150 then travels from location A to location B and lands at location B. The UAV 150 then uses micro hybrid system 10 to generate power for local use at location B, thereby acting as a portable flying generator. When power is no longer needed, the UAV 150 returns back to location A and awaits instructions for the next task.

In various embodiments, the UAV 150 uses the power provided by micro hybrid generator system 10 to travel from an initial location to a remote location, fly, land, and then generate power at the remote location. Upon completion of the task, the UAV 150 is ready to accept commands for its new task. All of this can be performed manually or through an autonomous/automated process. In various embodiments, the UAV 150 with micro hybrid generator system 10 can be used in an applicable application where carrying fuel and a local power generator are needed. Thus, the UAV 150 with a micro hybrid generator system 10 eliminates the need to carry both fuel and a generator to a remote location. The UAV 150 with a micro hybrid generator system 10 is capable of powering both the vehicle when in flight, and when not in flight can provide the same amount of available power to external loads. This may be useful in situations where power is needed for the armed forces in the field, in humanitarian or disaster relief situations where transportation of a generator and fuel is challenging, or in situations where there is a request for power that is no longer available.

Figure 9:
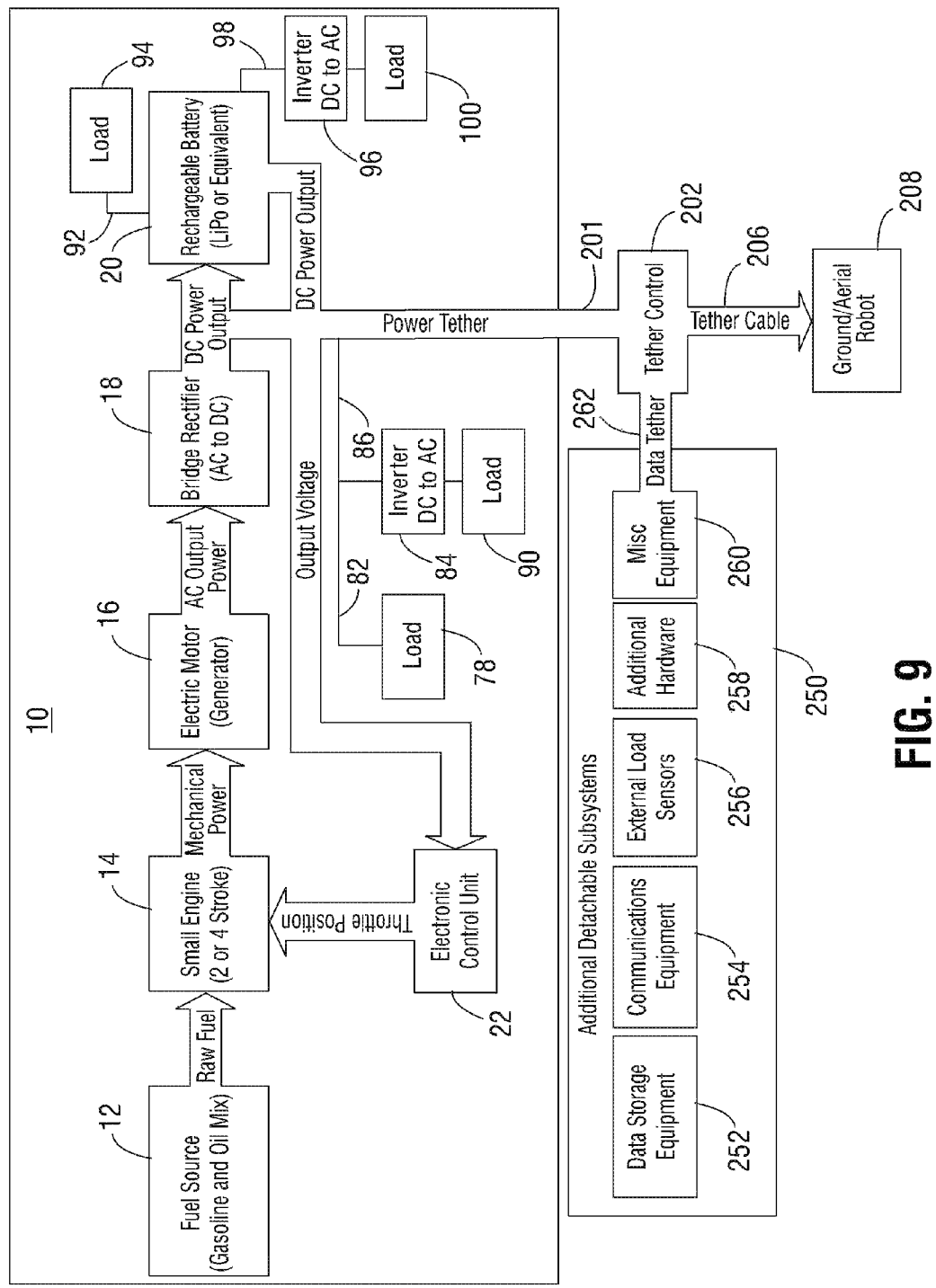
FIG. 9 depicts a system diagram for a micro hybrid generator system with detachable subsystems.

FIG. 9 depicts a diagram of another system for a micro hybrid generator system 10 with detachable subsystems. FIG. 10a depicts a diagram of a micro hybrid generator system 10 with detachable subsystems integrated as part of a UAV. FIG. 10b depicts a diagram of a micro hybrid generator system 10 with detachable subsystems integrated as part of a ground robot. In various embodiments, a tether line 201 is coupled to the DC output of bride rectifier 18 and rechargeable battery 20 of a micro hybrid control system 10. The tether line 201 can provide DC power output to a tether controller 202. The tether controller 202 is coupled between a tether cable 206 and a ground or aerial robot 208. In operation, as discussed in further detail below, the micro hybrid generator system 10 provides tethered power to the ground or aerial robot 208 with the similar output capabilities as discussed above with one or more of the Figs. in this paper.

The system shown in FIG. 9 can include additional detachable components 250 integrated as part of the system, e.g., data storage equipment 252, communications equipment 254, external load sensors 256, additional hardware 258, and various miscellaneous equipment 260 that can be coupled via data tether 262 to tether controller 202.

Figure 10:
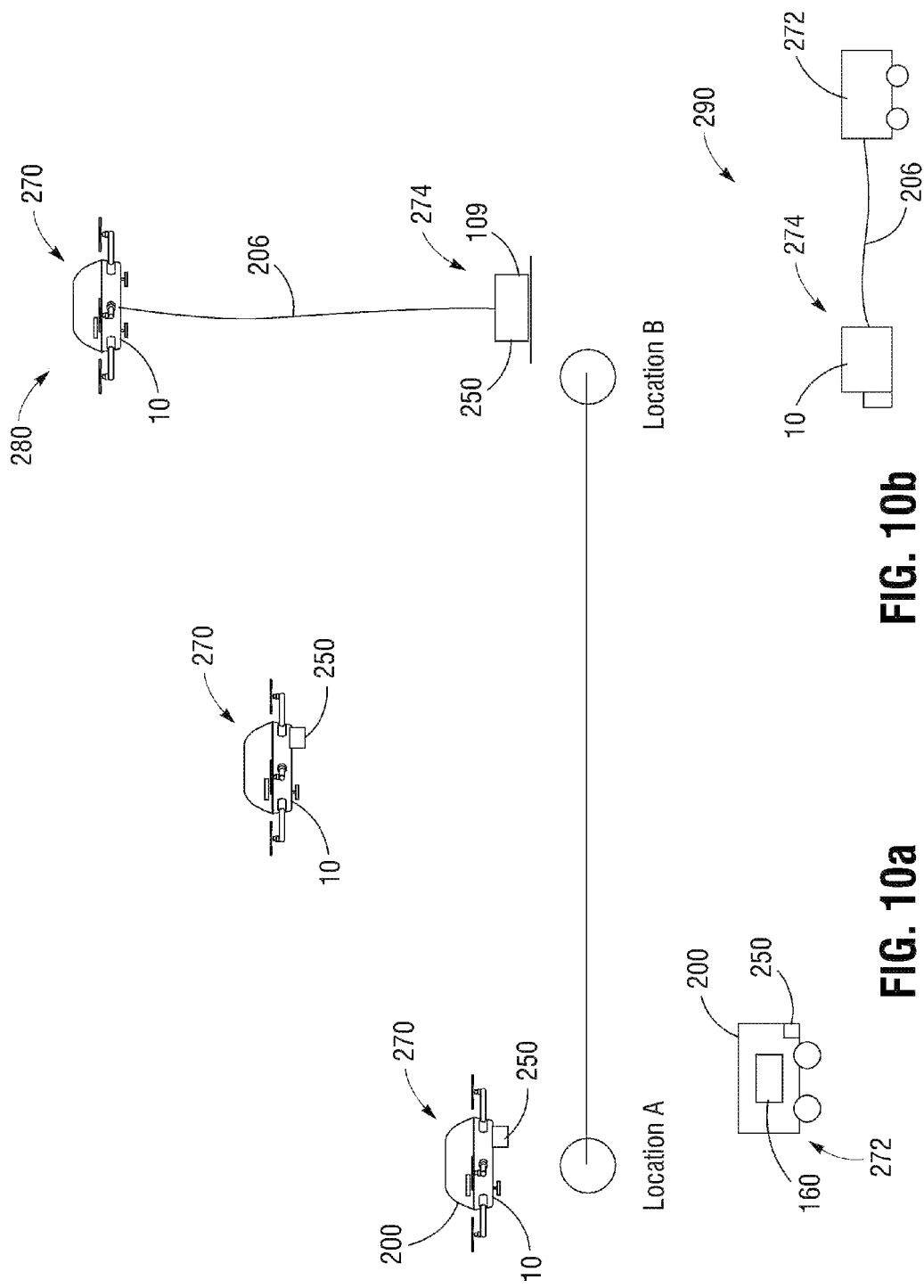
FIG. 10a depicts a diagram of a micro hybrid generator system with detachable subsystems integrated as part of a UAV.
FIG. 10b depicts a diagram of a micro hybrid generator system with detachable subsystems integrated as part of a ground robot.

In one example of operation of the system shown in FIG. 9, the system may be configured as part of a flying robot or UAV, such as flying robot or UAV 270, FIG. 10, or as ground robot 272. Portable tethered robotic system 200 starts a mission at location A. All or an applicable combination of the subsystems and ground, the tether controller, ground/aerial robot 208 can be powered by the micro hybrid generator system 10. The Portable tethered robotic system 200 travels either by ground, e.g., using ground robot 272 powered by micro hybrid generator system 10 or by air using flying robot or UAV 270 powered by micro hybrid generator system 10 to desired remote location B. At location B, portable tethered robotic system 200 configured as flying robot 270 or ground robot 272 can autonomously decouple micro hybrid generator system 10 and/or detachable subsystem 250, indicated at 274, which remain detached while ground robot 272 or flying robot or UAV 270 are operational. When flying robot or UAV 270 is needed at location B, indicated at 280, flying robot or UAV 270 can be operated using power provided by micro hybrid generator system coupled to tether cable 206. When flying robot or UAV 270 no longer has micro hybrid generator system 10 and/or additional components 250 attached thereto, it is significantly lighter and can be in flight for a longer period of time. In one example, flying robot or UAV 270 can take off and remain in a hovering position remotely for extended periods of time using the power provided by micro hybrid generator system 10.

Similarly, when ground robot 272 is needed at location B, indicated at 290, it may be powered by micro hybrid generator system 10 coupled to tether line 206 and will also be significantly lighter without micro hybrid generator system 10 and/or additional components 250 attached thereto. Ground robot 272 can also be used for extended periods of time using the power provide by micro hybrid generator system 10.

Figure 11:
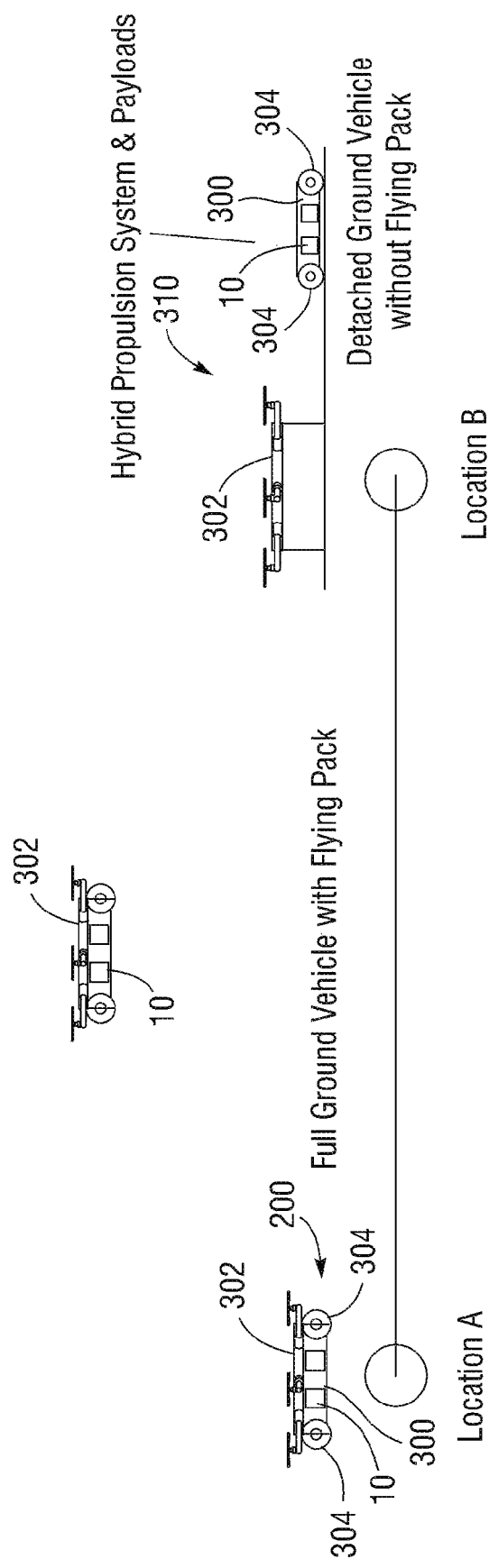
FIG. 11 shows a ground robot with a detachable flight pack in operation.

FIG. 11 shows a ground robot 300 with a detachable flying pack in operation. The detachable flying pack 302 includes micro hybrid generator system 10. The detachable flying pack is coupled to the ground robot 300 of one or more embodiments. The micro hybrid generator system 10 is embedded within the ground robot 300. The ground robot 300 is detachable from the flying pack 302. With such a design, a majority of the capability is embedded deep within the ground robot 300 which can operate 100% independently of the flying pack 302. When the ground robot 300 is attached to the flying pack 302, the flying pack 302 is powered from micro hybrid generator system 10 embedded in the ground robot 300 and the flying pack 302 provides flight. The ground robot 300 platform can be a leg wheel or threaded base motion.

In one embodiment, the ground robot 300 may include the detachable flying pack 302 and the micro hybrid generator system 10 coupled thereto as shown in FIG. 11. In this example, the ground robot 300 is a wheel-based robot as shown by wheels 304. In this example, the micro hybrid generator system 10, includes fuel source 12, small engine 14, generator motor 16, bridge rectifier 18, rechargeable battery 20, ECU 22, and optional inverters 84 and 96, as discussed above with reference to one or more Figs. in this paper. The micro hybrid generator system 10 also preferably includes data storage equipment 252, communications equipment 254, external load sensors 256, additional hardware 258, and miscellaneous communications 260 coupled to data line 262 as shown. The flying pack 302 is preferably, an aerial robotic platform such as a fixed wing, single rotor or multi rotor, aerial device, or similar type aerial device.

In one embodiment, the ground robot 300 and the aerial flying pack 302 are configured as a single unit. Power is delivered the from micro hybrid generator system 10 and is used to provide power to flying pack 302, so that ground robot 300 and flying pack 302 can fly from location A to location B. At location B, ground robot 304 detaches from flying pack 302, indicated at 310, and is able to maneuver and operate independently from flying pack 302. Micro hybrid generator system 10 is embedded in ground robot 300 such that ground robot 304 is able to be independently powered from flying pack 302. Upon completion of the ground mission, ground robot 300 is able to reattached itself to flying pack 302 and return to location A. All of the above operations can be manual, semi-autonomous, or fully autonomous.

In one embodiment, flying pack 302 can traverse to a remote location and deliver ground robot 300. At the desired location, there is no need for flying pack 302 so it can be left behind so that ground robot 300 can complete its mission without having to carry flying pack 302 as its payload. This may be useful for traversing difficult and challenging terrains, remote locations, and in situations where it is challenging to transport ground robot 300 to the location. Exemplary applications may include remote mine destinations, remote surveillance and reconnaissance, and package delivery services where flying pack 302 cannot land near an intended destination. In these examples, a designated safe drop zone for flying pack can be used and local delivery is completed by ground robot 300 to the destination.

In various embodiments, then a mission is complete, ground robot 272 or flying robot or UAV 270 can be autonomously coupled back to micro hybrid generator system 10. Additional detachable components 250 can auto be autonomously coupled back micro hybrid generator system 10. Portable tethered robotic system 200 with a micro hybrid generator system 10 configured a flying robot or UAV 270 or ground robot 272 then returns to location A using the power provided by micro hybrid generator system 10.

The result is portable tethered robotic system 200 with a micro hybrid generator system 10 is able to efficiently transport ground robot 272 or flying robot or UAV 270 to remote locations, automatically decouple ground robot 272 or flying robot or UAV 270, and effectively operate the flying robot 270 or ground robot 272 using tether power where it may be beneficial to maximize the operation time of the ground robot 270 or flying robot or UAV 272. System 200 provides modular detachable tethering which may be effective in reducing the weight of the tethered ground or aerial robot thereby reducing its power requirements significantly. This allows the aerial robot or UAV or ground robot to operate for significantly longer periods of time when compared to the original capability where the vehicle components are attached and the vehicle needs to sustain motion. System 200 eliminates the need to assemble a generator, robot and tether at remote locations and therefore saves time, resources, and expense. Useful applications of system 200 may include, inter alia, remote sensing, offensive or defensive military applications and/or communications networking, or multi-vehicle cooperative environments, and the like.

Figure 12:
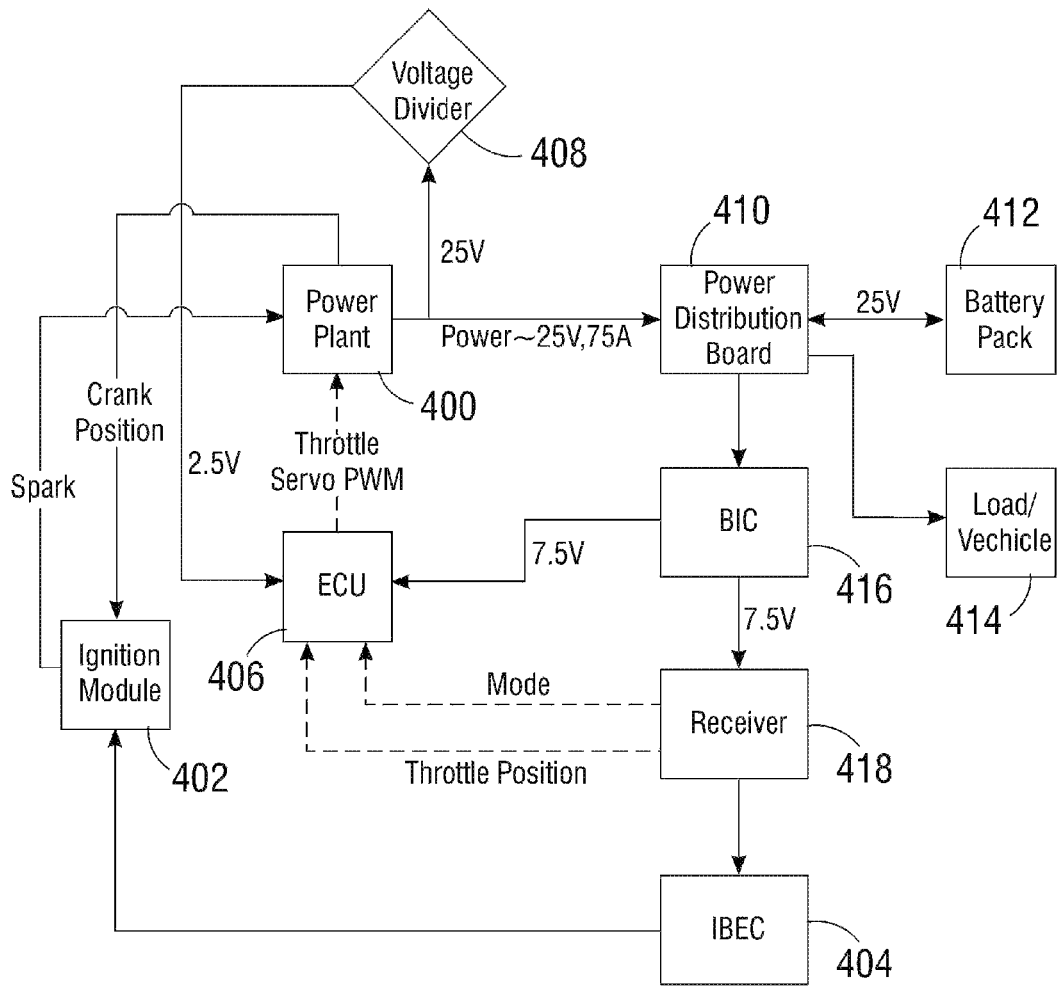
FIG. 12 shows a control system of a micro hybrid generator system.

FIG. 12 shows a control system of a micro hybrid generator system. The micro hybrid generator system includes a power plant 400 coupled to an ignition module 402. The ignition module 402 functions to start the power plant 400 by providing a physical spark to the power plant 402. The ignition module 402 is coupled to an ignition battery eliminator circuit (IBEC) 404. The IBEC 404 functions to power the ignition module 402.

The power plant 400 is configured to provide power. The power plant 400 includes a small engine and a generator. The power plant is controlled by the ECU 406. The ECU 406 is coupled to the power plant through a throttle servo. The ECU 406 can operate the throttle servo to control a throttle of a small engine to cause the power plant 400 to either increase or decrease an amount of produced power. The ECU 406 is coupled to a voltage divider 408. Through the voltage divider 408, the ECU can determine an amount of power the load/vehicle 414 is drawing to determine whether to increase, decrease, or keep a throttle of a small engine constant.

The power plant is coupled to a power distribution board 410. The power distribution board 410 can distribute power generated by the power plant 400 to either or both a battery pack 412 and a load/vehicle 414. The power distribution board 410 is coupled to a battery eliminator circuit (BEC) 416. The BEC 416 provides power to the ECU 406 and a receiver 418. The receiver 418 controls the IBEC 404 and functions to cause the IBEC 404 to power the ignition module 402. The receiver 418 also sends information to the ECU 406 used in controlling a throttle of a small engine of the power plant 400. The receiver 418 to the ECU information related to a throttle position of a throttle of a small engine and a mode in which the micro hybrid generation system is operating.

Figure 13:
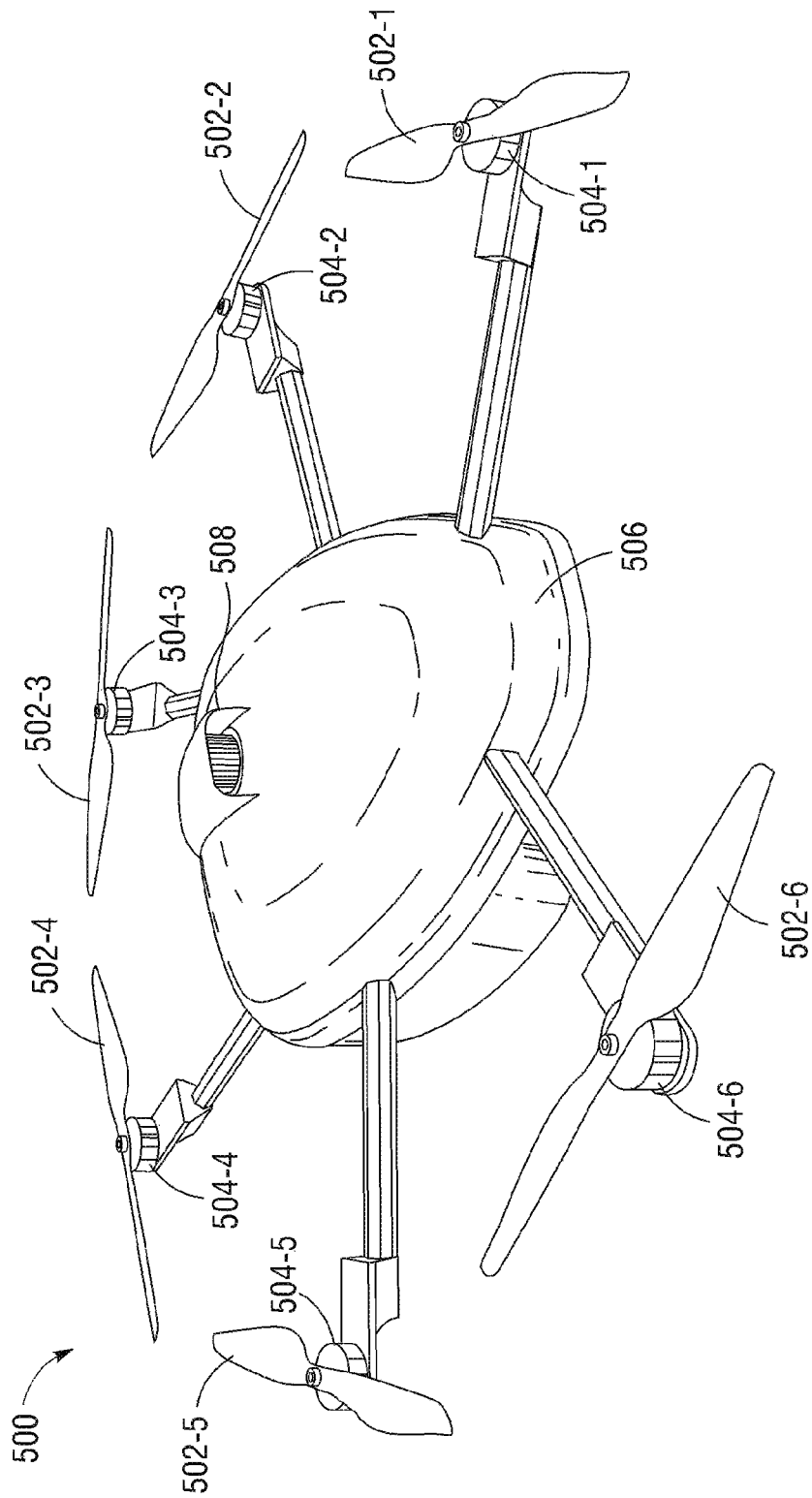
FIG. 13 shows a top perspective view of a top portion of a drone powered through a micro hybrid generator system.

FIG. 13 shows a top perspective view of a top portion 500 of a drone powered through a micro hybrid generator system. The top portion 500 of the drone shown in FIG. 13 includes six rotors 502-1 . . . 502-6 (hereinafter "rotors 502"). The rotors 502 are caused to spin by corresponding motors 504-1 . . . 504-6 (hereinafter "motors 504"). The motors 504 can be powered through a micro hybrid generator system. The top portion 500 of a drone includes a top surface 506. Edges of the top surface 506 can be curved to reduce air drag and improve aerodynamic performance of the drone. The top surface includes an opening 508 through which air can flow to aid in dissipating heat away from at least a portion of a micro hybrid generator system. In various embodiments, at least a portion of an air filter is exposed through the opening 508.

Figure 14:
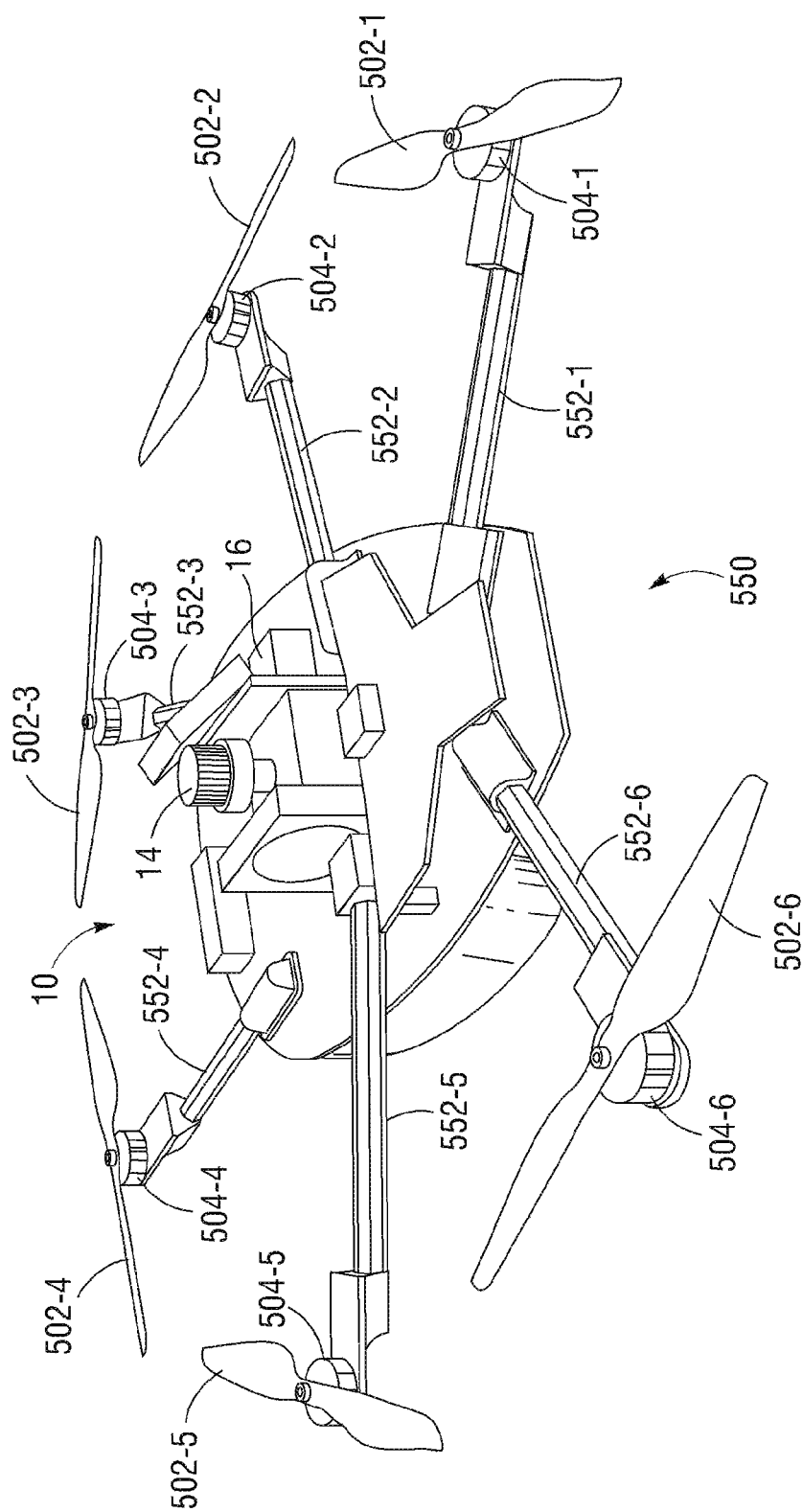
FIG. 14 shows a top perspective view of a bottom portion of a drone powered through a micro hybrid generator system.

FIG. 14 shows a top perspective view of a bottom portion 550 of a drone powered through a micro hybrid generator system 10. The micro hybrid generator system 10 includes a small engine 14 and a generator motor 16 to provide power to motors 504. The rotor motors 504 and corresponding rotors 502 are positioned away from a main body of a bottom portion 550 of the drone through arms 552-1 . . . 552-6 (hereinafter "arms 552"). An outer surface of the bottom portion of the bottom portion 550 of the drone and/or the arms 552 can have edges that are curved to reduce air drag and improve aerodynamic performance of the drone.

Figure 15:
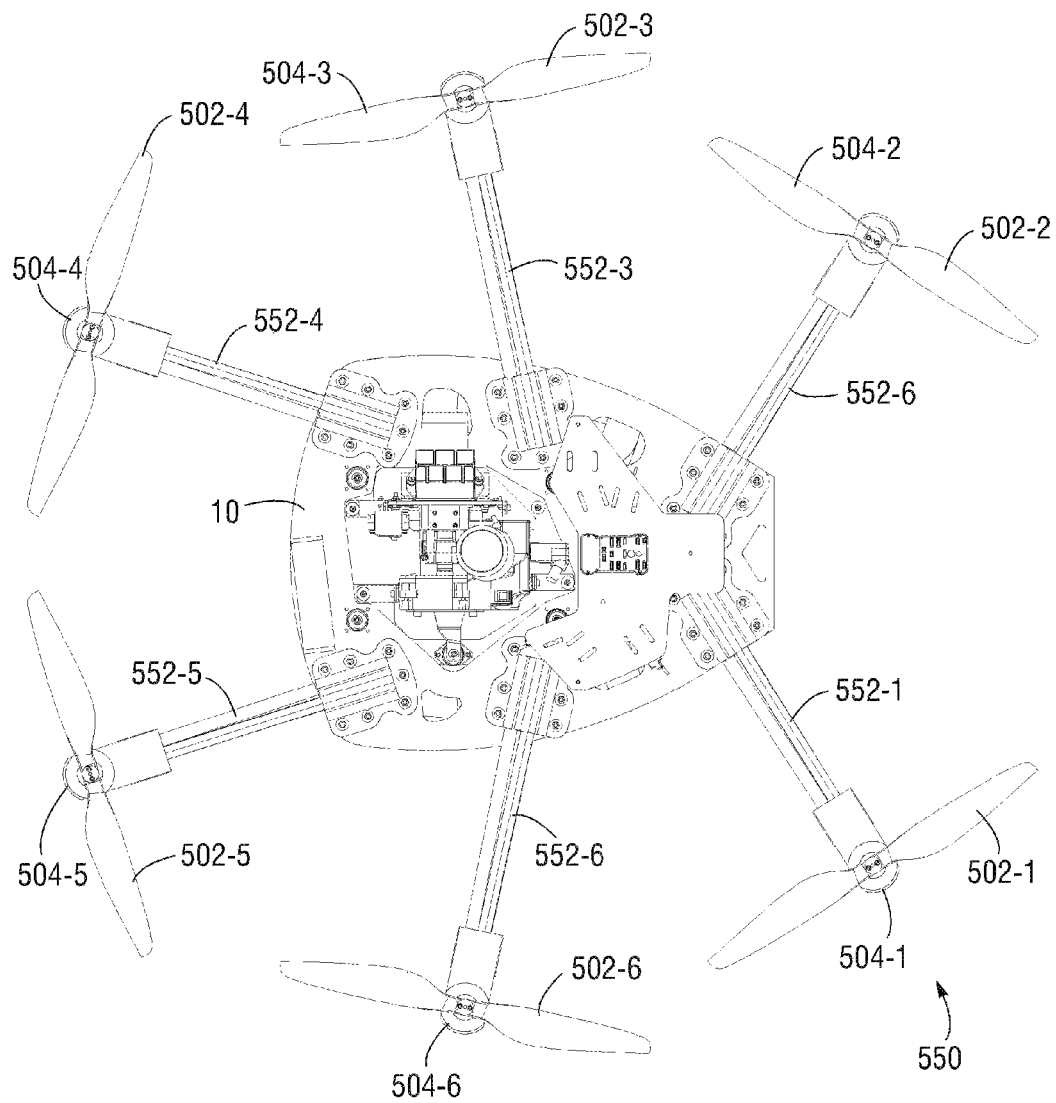
FIG. 15 shows a top view of a bottom portion of a drone powered through a micro hybrid generator system.

FIG. 15 shows a top view of a bottom portion 550 of a drone powered through a micro hybrid generator system 10. The rotor motors 504 and corresponding rotors 502 are positioned away from a main body of a bottom portion 550 of the drone through arms 552 An outer surface of the bottom portion of the bottom portion 550 of the drone and/or the arms 552 can have edges that are curved to reduce air drag and improve aerodynamic performance of the drone.

Figure 16:
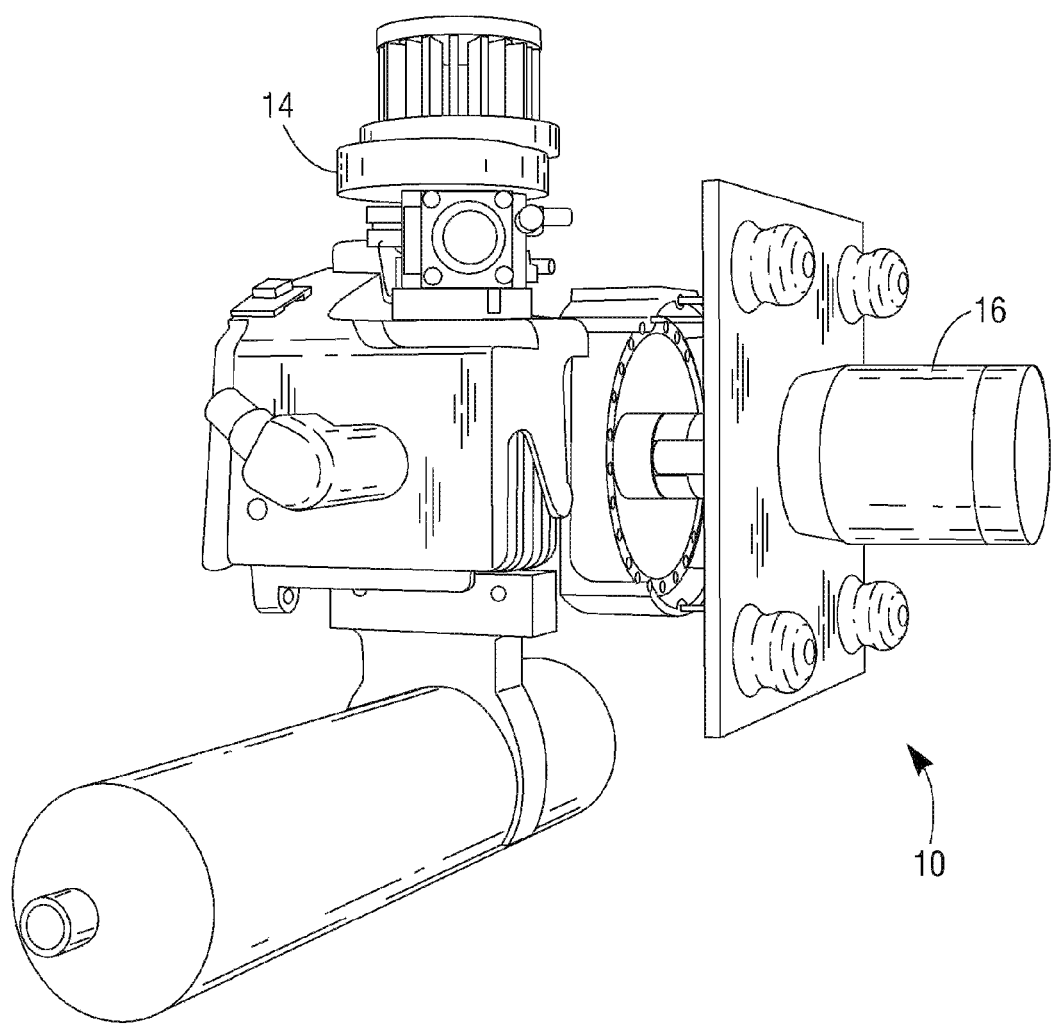
FIG. 16 shows a side perspective view of a micro hybrid generator system.

FIG. 16 shows a side perspective view of a micro hybrid generator system 10. The micro hybrid generator system 10 shown in FIG. 16 is capable of providing 1.8 kW of power. The micro hybrid generator system 10 include a small engine 14 coupled to a generator motor 16. The small engine 14 can provide approximately 3 horsepower. The generator motor 16 functions to generate AC output power using mechanical power generated by the small engine 14.

Figure 17:
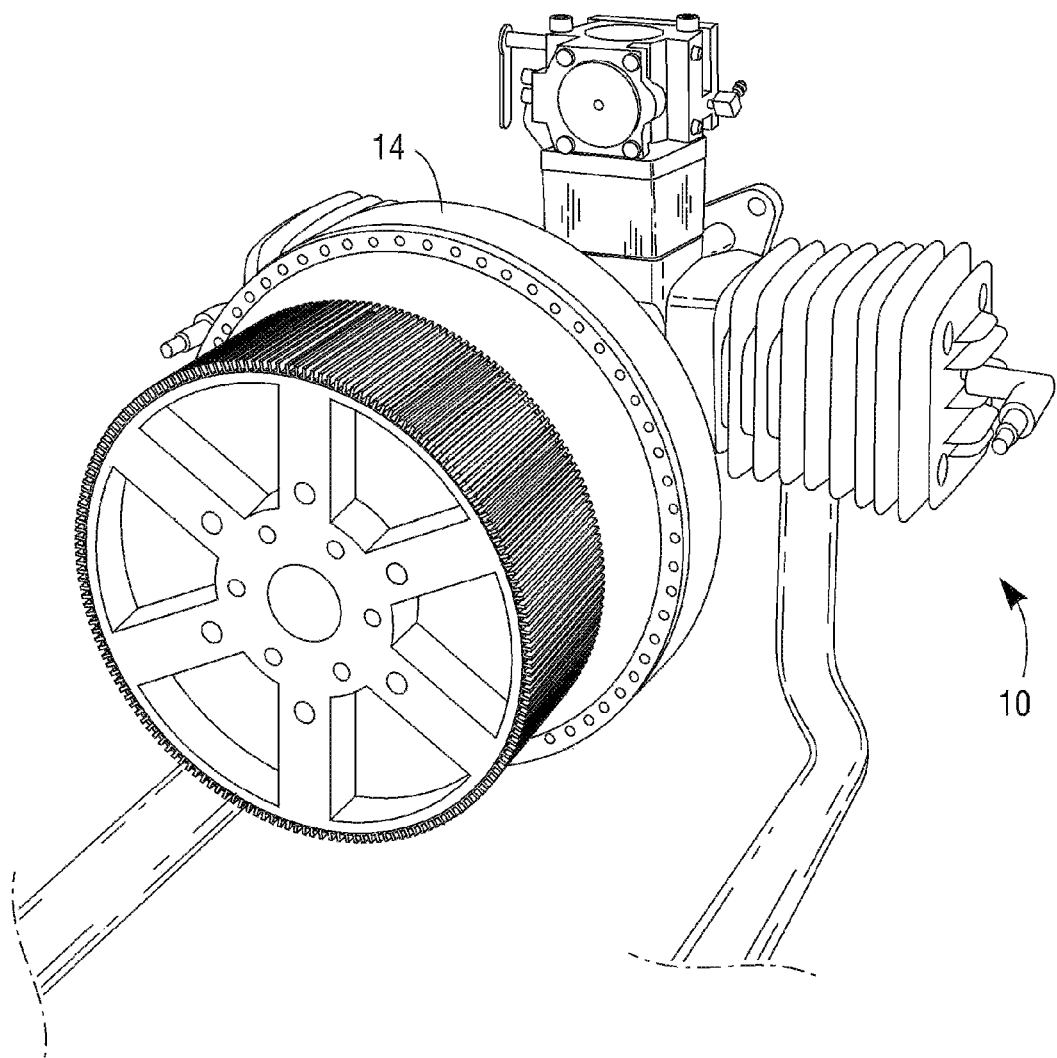
FIG. 17 shows a side perspective view of a micro hybrid generator system.

FIG. 17 shows a side perspective view of a micro hybrid generator system 10. The micro hybrid generator system 10 shown in FIG. 17 is capable of providing 10 kW of power. The micro hybrid generator system 10 include a small engine 14 coupled to a generator motor. The small engine 14 can provide approximately 15-16.5 horsepower. The generator motor functions to generate AC output power using mechanical power generated by the small engine 14.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art.

We claim:

1. A system comprising:
    an unmanned aerial vehicle comprising:
        a propeller, and
        a rotor motor configured to drive rotation of the propeller;
    an energy source configured to provide electrical energy to the rotor motor, the energy source being a hybrid energy generation system including an engine coupled to a generator;
    an electronic device detachable from the unmanned aerial vehicle; and
    a cable configured to electrically connect the unmanned aerial vehicle to the electronic device;
    wherein the electronic device includes the energy source, and
    wherein the system has (1) a first configuration in which the electronic device including the energy source is attached to the unmanned aerial vehicle and the unmanned aerial vehicle with the attached electronic device is capable of flight, and (2) a second configuration in which the electronic device including the energy source is detached from the unmanned aerial vehicle and the unmanned aerial vehicle without the electronic device is capable of flight, electrical energy being provided from the energy source of detached electronic device to the rotor motor through the cable.

2. The system of claim 1, in which the cable comprises a power transmission cable.

3. The system of claim 1, in which the cable comprises a data transmission cable.

4. The system of claim 1, in which the electronic device forms part of the unmanned aerial vehicle.

5. The system of claim 1, in which the electronic device comprises a robotic device.

6. The system of claim 5, in which the robotic device comprises a vehicle configured to move along the ground.

7. The system of claim 5, in which the robotic device comprises a second unmanned aerial vehicle.

8. The system of claim 1, in which the electronic device is detachable from the unmanned aerial vehicle by an automated process.

9. The system of claim 1, in which the electronic device is detachable from the unmanned aerial vehicle while the unmanned aerial vehicle is airborne.

10. The system of claim 1, in which the electronic device is configured to be reattached to the unmanned aerial vehicle.

11. The system of claim 1, in which the cable is configured to be detachable from the detached electronic device.

12. The system of claim 11, in which the detached electronic device is configured to be operational after detachment of the cable.

13. The system of claim 1, comprising a second electronic device; in which the cable is configured to electrically connect the energy source to the second electronic device.

14. The system of claim 13, in which the second electronic device is detachable from the unmanned aerial vehicle.

15. The system of claim 14, in which the second electronic device comprises one or more of a data storage device, a communications device, and a sensor.

16. The system of claim 1, in which the hybrid energy generation system comprises:
    a rechargeable battery configured to provide electrical energy to the rotor motor;
    the engine, the engine being configured to generate mechanical energy; and
    the generator, the generator being configured to convert the mechanical energy generated by the engine into electrical energy.

17. The system of claim 16, in which the cable is configured to electrically connect one or more of the rechargeable battery and the generator to the electronic device.

18. The system of claim 16, in which the engine is coupled to the generator through a flexible coupling.

19. The system of claim 18, in which a rotor of the engine is coupled to the generator through a coupling device, the coupling device including a flexible coupling and a fan.

20. The system of claim 1, in which in the second configuration, the unmanned aerial vehicle is capable of flight and the electronic device including the energy source is disposed on a surface.

21. A method comprising:
    providing electrical energy from an energy source to a rotor motor configured to drive rotation of a propeller of an unmanned aerial vehicle, the energy source being a hybrid energy generation system including an engine coupled to a generator;
    operating the unmanned aerial vehicle in a first configuration in which an electronic device including the energy source is attached to the unmanned aerial vehicle, the unmanned aerial vehicle with the attached electronic device being capable of flight;

detaching the electronic device including the energy source from the unmanned aerial vehicle; and operating the unmanned aerial vehicle in a second configuration in which the electronic device including the energy source is detached from the unmanned aerial vehicle, the unmanned aerial vehicle without the electronic device being capable of flight, electrical energy being provided from the energy source of the detached electronic device to the rotor motor of the unmanned aerial vehicle through a cable connecting the unmanned aerial vehicle to the detached electronic device.

22. The method of claim 21, in which detaching the electronic device comprises detaching the electronic device while the unmanned aerial vehicle is airborne.

23. The method of claim 22, in which detaching the electronic device comprises lowering the electronic device from the airborne unmanned aerial vehicle to the ground.

24. The method of claim 21, comprising operating the detached electronic device to move along the ground.

25. The method of claim 22, comprising detaching the cable from the detached electronic device.

26. The method of claim 25, comprising operating the detached electronic device after detaching the cable from the detached electronic device.

27. The method of claim 21, comprising reattaching the electronic device to the unmanned aerial vehicle.

28. The method of claim 21, comprising detaching multiple electronic devices from the unmanned aerial vehicle.

29. The method of claim 21, in which providing electrical energy from an energy source comprises operating the hybrid energy generation system, the hybrid energy generation system including:

a rechargeable battery configured to provide electrical energy to the rotor motor;

the engine, the engine being configured to generate mechanical energy;

the generator, the generator being configured to convert the mechanical energy generated by the engine into electrical energy; and a coupling device coupling a rotor of the engine to the generator, the coupling device including a flexible coupling and a fan.

30. The method of claim 21, in which operating the unmanned aerial vehicle in the second configuration includes causing the unmanned aerial vehicle to be airborne and causing the electronic device including the energy source to be disposed on a surface.

\* \* \* \* \*